United States Patent
Miyazaki et al.

(10) Patent No.: US 10,017,634 B2
(45) Date of Patent: *Jul. 10, 2018

(54) PNEUMATIC TIRE AND RUN-FLAT TIRE

(71) Applicant: SUMITOMO RUBBER INDUSTRIES, LTD., Kobe-shi, Hyogo (JP)

(72) Inventors: Sumiko Miyazaki, Kobe (JP); Kenya Watanabe, Kobe (JP); Ryo Miyamori, Tokyo (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/135,831

(22) Filed: Apr. 22, 2016

(65) Prior Publication Data

US 2016/0340501 A1 Nov. 24, 2016

(30) Foreign Application Priority Data

| May 20, 2015 | (JP) | 2015-103227 |
| May 20, 2015 | (JP) | 2015-103228 |
| May 20, 2015 | (JP) | 2015-103229 |
| May 20, 2015 | (JP) | 2015-103230 |
| May 20, 2015 | (JP) | 2015-103231 |
| May 20, 2015 | (JP) | 2015-103232 |

(51) Int. Cl.
*C08L 9/00* (2006.01)
*B60C 1/00* (2006.01)
*C08L 7/00* (2006.01)
*D01F 2/28* (2006.01)
*B60C 11/00* (2006.01)
*B60C 17/00* (2006.01)
*C08L 9/06* (2006.01)
*C08L 23/22* (2006.01)

(52) U.S. Cl.
CPC .............. *C08L 9/00* (2013.01); *B60C 1/0008* (2013.01); *B60C 1/0016* (2013.01); *B60C 1/0041* (2013.01); *B60C 11/0008* (2013.01); *B60C 17/00* (2013.01); *C08L 7/00* (2013.01); *C08L 9/06* (2013.01); *C08L 23/22* (2013.01); *D01F 2/28* (2013.01); *B60C 1/0025* (2013.01); *B60C 2001/005* (2013.01); *B60C 2001/0033* (2013.01); *B60C 2001/0058* (2013.01); *B60C 2001/0066* (2013.01); *B60C 2001/0083* (2013.01); *Y02T 10/862* (2013.01)

(58) Field of Classification Search
CPC . D01F 2/28; B60C 1/0016; B60C 2001/0033; C08L 9/00; Y02T 10/862
See application file for complete search history.

(56) References Cited

U.S. PATENT DOCUMENTS

2016/0340500 A1* 11/2016 Miyazaki ................ C08L 21/00

FOREIGN PATENT DOCUMENTS

| JP | 2009-84564 A | 4/2009 |
| JP | 2010-254925 A | 11/2010 |
| JP | 2013-204010 A | 10/2013 |
| JP | 2014-31649 A | 2/2014 |
| JP | 2014214300 A | * 11/2014 |

* cited by examiner

*Primary Examiner* — Sanza L. McClendon
(74) *Attorney, Agent, or Firm* — Birch, Stewart, Kolasch & Birch LLP

(57) ABSTRACT

Provided is a pneumatic tire including a sidewall that has a good balance of excellent handling stability, rolling resistance, and durability and further has excellent flex crack growth resistance. The sidewall is formed from a modified cellulose fiber-containing rubber composition that is allowed to simultaneously achieve excellent rigidity, excellent tensile properties, and low energy loss by improving the dispersibility of the cellulose fiber in rubber. The present invention relates to a pneumatic tire including a sidewall formed from a modified cellulose fiber-containing rubber composition, the modified cellulose fiber-containing rubber composition containing a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C).

36 Claims, No Drawings

PNEUMATIC TIRE AND RUN-FLAT TIRE

TECHNICAL FIELD

The present invention relates to pneumatic tires and run-flat tires.

BACKGROUND ART

By incorporating microfibrillated plant fibers such as cellulose fibers as fillers into rubber compositions, the rubber compositions can be reinforced to show higher modulus (complex elastic modulus). However, since microfibrillated plant fibers are highly self-aggregative and poorly compatible with rubber components, they are less likely to be dispersed in rubber during kneading. For this reason, the incorporation of microfibrillated plant fibers can deteriorate tensile properties or fuel economy in some cases. Therefore, there is a need for methods for improving the dispersibility of microfibrillated plant fibers.

Another problem is that when a water dispersion of cellulose fibers is dried, the cellulose fibers are then aggregated, and thus such cellulose fibers cannot be dispersed at the nano level if they are directly mixed with rubber. For this reason, it is difficult to improve tensile strength and to reduce rolling resistance. Methods for solving this problem have been proposed (for example, Patent Literature 1) in which cellulose fibers are dispersed in rubber by temporarily dispersing the cellulose fibers in water and adding rubber latex to the dispersion, followed by stirring and then drying.

Other attempts have been made to improve the dispersibility of cellulose fibers in rubber by using a compatibilizer, by modifying cellulose fibers, or by using a fibrillating resin.

For example, Patent Literature 2 discloses a method for improving the compatibility of microfibrillated cellulose with rubber by chemically modifying the microfibrillated cellulose.

Patent Literature 3 discloses a method for improving the dispersibility of cellulose fibers in a rubber component, according to which cellulose fibers are modified by introducing a vinyl group therein, via which a cross linkage can be formed between the cellulose fibers and the rubber component to increase their compatibility.

CITATION LIST

Patent Literature

Patent Literature 1: JP 2013-204010 A
Patent Literature 2: JP 2009-084564 A
Patent Literature 3: JP 2010-254925 A

SUMMARY OF INVENTION

Technical Problem

As described above, various methods for improving the dispersibility of cellulose fibers in rubber have been examined. However, for example, the method of Patent Literature 1 effectively disperses cellulose fibers, but the form of rubber used is unfortunately limited to latex. Also, the methods of Patent Literatures 2 and 3 leave room for improvement because the use of cellulose fibers instead of conventional fillers such as carbon black does not provide advantages in view of reinforcing properties, cost, and the like.

Accordingly, in order to improve the dispersibility of cellulose fibers in rubber to obtain rubber compositions with excellent tensile properties and low energy loss, further improvements are required.

The present invention aims to solve the above problem and provide a pneumatic tire including a sidewall that has a good balance of excellent handling stability, rolling resistance, and durability and further has excellent flex crack growth resistance, wherein the sidewall is formed from a modified cellulose fiber-containing rubber composition that is allowed to simultaneously achieve excellent rigidity, excellent tensile properties, and low energy loss by improving the dispersibility of the cellulose fiber in rubber.

The present invention also aims to solve the above problem and provide a pneumatic tire including a base tread that has a good balance of excellent handling stability, rolling resistance, and durability and further has excellent tire durability, wherein the base tread is formed from a modified cellulose fiber-containing rubber composition that is allowed to simultaneously achieve excellent rigidity, excellent tensile properties, and low energy loss by improving the dispersibility of the cellulose fiber in rubber.

The present invention also aims to solve the above problem and provide a pneumatic tire including a breaker topping that has a good balance of excellent handling stability, rolling resistance, and durability and further has excellent adhesion, wherein the breaker topping is formed from a modified cellulose fiber-containing rubber composition that is allowed to simultaneously achieve excellent rigidity, excellent tensile properties, and low energy loss by improving the dispersibility of the cellulose fiber in rubber.

The present invention also aims to solve the above problem and provide a pneumatic tire including an innerliner that has excellent air permeation resistance, rolling resistance, and durability, wherein the innerliner is formed from a modified cellulose fiber-containing rubber composition that is allowed to simultaneously achieve excellent air permeation resistance, excellent tensile properties, and low energy loss by improving the dispersibility of the cellulose fiber in rubber.

The present invention also aims to solve the above problem and provide a pneumatic tire having a good balance of excellent handling stability, rolling resistance, and durability, which is formed from a modified cellulose fiber-containing rubber composition that is allowed to simultaneously achieve excellent rigidity, excellent tensile properties, and low energy loss by improving the dispersibility of the cellulose fiber in rubber.

The present invention also aims to solve the above problem and provide a run-flat tire including a lining strip layer that has a good balance of excellent handling stability, rolling resistance, and durability and further has excellent run-flat durability, wherein the lining strip layer is formed from a modified cellulose fiber-containing rubber composition that is allowed to simultaneously achieve excellent rigidity, excellent tensile properties, and low energy loss by improving the dispersibility of the cellulose fiber in rubber.

Solution to Problem

The present invention relates to a pneumatic tire, including a sidewall formed from a modified cellulose fiber-containing rubber composition, the modified cellulose fiber-containing rubber composition containing a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C).

The present invention also relates to a pneumatic tire, including a base tread formed from a modified cellulose fiber-containing rubber composition, the modified cellulose fiber-containing rubber composition containing a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C).

The present invention also relates to a pneumatic tire, including a breaker topping formed from a modified cellulose fiber-containing rubber composition, the modified cellulose fiber-containing rubber composition containing a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C).

The present invention also relates to a pneumatic tire, including an innerliner formed from a modified cellulose fiber-containing rubber composition, the modified cellulose fiber-containing rubber composition containing a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C).

The present invention also relates to a pneumatic tire, including at least one selected from the group consisting of a bead apex, a clinch apex, a ply topping, and a tread each formed from a modified cellulose fiber-containing rubber composition, the modified cellulose fiber-containing rubber composition containing a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C).

The present invention also relates to a run-flat tire, including a lining strip layer formed from a modified cellulose fiber-containing rubber composition, the modified cellulose fiber-containing rubber composition containing a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C).

The cyclic polybasic acid anhydride (a) is preferably at least one selected from the group consisting of acid anhydride group-containing petroleum resins and acid anhydride group-containing coal resins.

The dispersing polymer (B) is preferably at least one selected from the group consisting of petroleum resins and coal resins.

The rubber component (C) is preferably at least one selected from the group consisting of natural rubber, modified natural rubbers, synthetic rubbers, and modified synthetic rubbers.

Preferably, the modified cellulose fiber-containing rubber composition contains the modified cellulose fiber (A) in an amount of 0.01 to 30 parts by mass relative to 100 parts by mass of the rubber component (C).

Preferably, the modified cellulose fiber-containing rubber composition is obtained by the steps of: kneading the modified cellulose fiber (A) with the dispersing polymer (B) to give a kneaded mixture, and kneading the kneaded mixture with the rubber component (C).

Advantageous Effects of Invention

The pneumatic tire according to the first aspect of the present invention includes a sidewall formed from a modified cellulose fiber-containing rubber composition that contains a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C). In the modified cellulose fiber-containing rubber composition, the dispersibility of the cellulose fiber in rubber is improved and therefore excellent rigidity, excellent tensile properties, and low energy loss can be simultaneously achieved. Thus, the pneumatic tire including a sidewall has a good balance of excellent handling stability, rolling resistance, and durability and further has excellent flex crack growth resistance. Moreover, in general, when cellulose fibers are incorporated in rubber compositions, the cellulose fibers are aligned in the extrusion direction (in the circumferential direction of the tire), so that the rigidity in the extrusion direction is improved, whereas the rigidity in the direction orthogonal to the extrusion direction (in the radial direction of the tire) is not much improved. In contrast, according to the first aspect of the invention, excellent rigidity can be achieved not only in the tire circumferential direction but also in the tire radial direction, and therefore the resulting pneumatic tire including a sidewall has very excellent handling stability. This effect is presumably due to the good dispersibility of the cellulose fiber in rubber.

The pneumatic tire according to the second aspect of the present invention includes a base tread formed from a modified cellulose fiber-containing rubber composition that contains a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C). In the modified cellulose fiber-containing rubber composition, the dispersibility of the cellulose fiber in rubber is improved and therefore excellent rigidity, excellent tensile properties, and low energy loss can be simultaneously achieved. Thus, the pneumatic tire including a base tread has a good balance of excellent handling stability, rolling resistance, and durability and further has excellent tire durability. Moreover, in general, when cellulose fibers are incorporated in rubber compositions, the cellulose fibers are aligned in the extrusion direction (in the circumferential direction of the tire), so that the rigidity in the extrusion direction is improved, whereas the rigidity in the direction orthogonal to the extrusion direction (in the radial direction of the tire) is not much improved. In contrast, according to the second aspect of the invention, excellent rigidity can be achieved not only in the tire circumferential direction but also in the tire radial direction, and therefore the resulting pneumatic tire including a base tread has very excellent handling stability. This effect is presumably due to the good dispersibility of the cellulose fiber in rubber.

The pneumatic tire according to the third aspect of the present invention includes a breaker topping formed from a modified cellulose fiber-containing rubber composition that contains a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C). In the modified cellulose fiber-containing rubber composition, the dispersibility of the cellulose fiber in rubber is improved and therefore excellent rigidity, excellent tensile properties, and low energy loss can be simultaneously achieved. Thus, the pneumatic tire including a breaker topping has a good balance of excellent handling stability, rolling resistance, and durability and further has excellent adhesion. Moreover, in general, when cellulose fibers are incorporated in rubber compositions, the cellulose fibers are aligned in the extrusion direction (in the circumferential direction of the tire), so that the rigidity in the extrusion direction is improved, whereas the rigidity in the direction orthogonal to the extrusion direction (in the radial direction of the tire) is not much improved. In contrast, according to the third aspect of the invention, excellent rigidity can be achieved not only in the tire circumferential direction but also in the tire radial direction, and therefore the resulting pneumatic tire including a breaker topping has very excellent handling stability. This effect is presumably due to the good dispersibility of the cellulose fiber in rubber.

The pneumatic tire according to the fourth aspect of the present invention includes an innerliner formed from a modified cellulose fiber-containing rubber composition that contains a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C). In the modified cellulose fiber-containing rubber composition, the dispersibility of the cellulose fiber in rubber is improved and therefore excellent air permeation resistance, excellent tensile properties, and low energy loss can be simultaneously achieved. Thus, the pneumatic tire including an innerliner has excellent air permeation resistance, rolling resistance, and durability.

The pneumatic tire according to the fifth aspect of the present invention includes at least one selected from the group consisting of a bead apex, a clinch apex, a ply topping, and a tread each formed from a modified cellulose fiber-containing rubber composition that contains a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C). In the modified cellulose fiber-containing rubber composition, the dispersibility of the cellulose fiber in rubber is improved and therefore excellent rigidity, excellent tensile properties, and low energy loss can be simultaneously achieved. Thus, the pneumatic tire has a good balance of excellent handling stability, rolling resistance, and durability. Moreover, in general, when cellulose fibers are incorporated in rubber compositions, the cellulose fibers are aligned in the extrusion direction (in the circumferential direction of the tire), so that the rigidity in the extrusion direction is improved, whereas the rigidity in the direction orthogonal to the extrusion direction (in the radial direction of the tire) is not much improved. In contrast, according to the fifth aspect of the invention, excellent rigidity can be achieved not only in the tire circumferential direction but also in the tire radial direction, and therefore the resulting pneumatic tire has very excellent handling stability. This effect is presumably due to the good dispersibility of the cellulose fiber in rubber.

The run-flat tire according to the sixth aspect of the present invention includes a lining strip layer formed from a modified cellulose fiber-containing rubber composition that contains a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C). In the modified cellulose fiber-containing rubber composition, the dispersibility of the cellulose fiber in rubber is improved and therefore excellent rigidity, excellent tensile properties, and low energy loss can be simultaneously achieved. Thus, the run-flat tire including a lining strip layer has a good balance of excellent handling stability, rolling resistance, and durability and further has excellent run-flat durability. Moreover, in general, when cellulose fibers are incorporated in rubber compositions, the cellulose fibers are aligned in the extrusion direction (in the circumferential direction of the tire), so that the rigidity in the extrusion direction is improved, whereas the rigidity in the direction orthogonal to the extrusion direction (in the radial direction of the tire) is not much improved. In contrast, according to the sixth aspect of the invention, excellent rigidity can be achieved not only in the tire circumferential direction but also in the tire radial direction, and therefore the resulting run-flat tire including a lining strip layer has very excellent handling stability. This effect is presumably due to the good dispersibility of the cellulose fiber in rubber.

Herein, the circumferential direction of the tire (tire circumferential direction) and the radial direction of the tire (tire radial direction) specifically refer to the directions shown in, for example, FIG. 1 of JP 2009-202865 A, which is incorporated herein by reference.

DESCRIPTION OF EMBODIMENTS

The pneumatic tire according to the first aspect of the invention includes a sidewall formed from a modified cellulose fiber-containing rubber composition that contains a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C).

The pneumatic tire according to the second aspect of the invention includes a base tread formed from a modified cellulose fiber-containing rubber composition that contains a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C).

The pneumatic tire according to the third aspect of the invention includes a breaker topping formed from a modified cellulose fiber-containing rubber composition that contains a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C).

The pneumatic tire according to the fourth aspect of the invention includes an innerliner formed from a modified cellulose fiber-containing rubber composition that contains a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C).

The pneumatic tire according to the fifth aspect of the invention includes at least one tire component selected from the group consisting of a bead apex, a clinch apex, a ply topping, and a tread each formed from a modified cellulose fiber-containing rubber composition that contains a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C).

The run-flat tire according to the sixth aspect of the invention includes a lining strip layer formed from a modified cellulose fiber-containing rubber composition that contains a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C).

The modified cellulose fiber-containing rubber composition which is commonly used in the first to sixth aspects of the invention is firstly described.

The modified cellulose fiber-containing rubber composition contains a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C).

The modified cellulose fiber (A) is obtained by adding a C15 or higher cyclic polybasic acid anhydride (a) containing a hydrophobic group (hereinafter, also referred to simply as "cyclic polybasic acid anhydride (a)" or "acid anhydride (a)") to a cellulose fiber.

Non-limiting examples of cellulose fibers that can be used to obtain the modified cellulose fiber (A) include plant-derived fibers contained in wood, bamboo, hemp, jute, kenaf, cotton, beet or the like; pulp prepared from the plant-derived fibers; mercerized cellulose fibers; regenerated cellulose fibers such as rayon, cellophane, or lyocell; and celluloses modified with acid anhydrides. Preferred materials for cellulose fibers include wood such as Sitka spruce, *Cryptomeria, Chamaecyparis, Eucalyptus, Acacia*, or the like. Thus, cellulose fibers obtained by fibrillating pulp, paper, or waste paper made from these materials can be suitably used. Each of these cellulose fibers may be used alone, or two or more types selected therefrom may be used.

Examples of the pulp include those obtained by chemical pulping, mechanical pulping, or chemical and mechanical pulping of the above plant materials, such as chemical pulp (kraft pulp (KP), sulfite pulp (SP)), semichemical pulp (SCP), chemi-ground pulp (CGP), chemi-mechanical pulp (CMP), ground wood pulp (GP), refiner mechanical pulp (RMP), thermomechanical pulp (TMP), or chemi-thermo-mechanical pulp (CTMP).

The cellulose fiber may be one in which the hydroxyl groups are partially esterified or partially substituted by functional groups such as carboxyl groups as long as the reactivity and degree of substitution with the C15 or higher cyclic polybasic acid anhydride (a) containing a hydrophobic group, the compatibility with rubber, and the like are not largely affected and a rubber composition with desired properties can be obtained without difficulty. Moreover, the water contained in the cellulose fiber is preferably preliminarily replaced with a solvent such as toluene or N-methylpyrrolidone so as not to inhibit the reaction with the C15 or higher cyclic polybasic acid anhydride (a) containing a hydrophobic group.

The C15 or higher cyclic polybasic acid anhydride (a) containing a hydrophobic group may be any cyclic polybasic acid anhydride that contains a hydrophobic group in the backbone and/or a side chain thereof and has 15 or more, preferably 20 or more carbon atoms. If the number of carbon atoms is less than 15, the modified cellulose fiber (A) cannot have good compatibility with rubber, with the result that the rubber composition fails to simultaneously achieve excellent tensile properties, low energy loss, and excellent rigidity or air permeation resistance. The upper limit of the number of carbon atoms in the C15 or higher cyclic polybasic acid anhydride (a) containing a hydrophobic group is not particularly limited and is, for example, preferably 1,500, more preferably 200, still more preferably 30. When the number of carbon atoms is more than 1,500, the resulting modified cellulose fiber (A) cannot be readily kneaded with the dispersing polymer (B) and the rubber component (C) and is therefore insufficiently dispersed, with the result that the rubber composition may fail to simultaneously achieve excellent tensile properties, low energy loss, and excellent rigidity or air permeation resistance.

The cyclic polybasic acid anhydride (a) is a cyclic polybasic acid anhydride that contains a hydrophobic group in the backbone or a side chain thereof.

The cyclic polybasic acid anhydride is not particularly limited as long as it is a polybasic acid anhydride having a cyclic structure that is formed by dehydration condensation within one molecule of a polybasic acid or between two or more polybasic acids. In particular, it is preferably a polybasic acid anhydride having a cyclic structure that is formed by dehydration condensation within one molecule of a polybasic acid.

Examples of the polybasic acid include tribasic acids such as aconitic acid or trimellitic acid; and dibasic acids such as succinic acid, itaconic acid, maleic acid, fumaric acid, or citraconic acid. Preferred among these are dibasic acids; more preferred are dicarboxylic acids such as succinic acid, itaconic acid, maleic acid, fumaric acid, or citraconic acid; still more preferred is succinic acid or maleic acid.

Examples of the cyclic polybasic acid anhydride include C4-C10, preferably C4-C6 cyclic carboxylic acid anhydrides, such as succinic anhydride, maleic anhydride, citraconic anhydride, or itaconic anhydride. Among these, succinic anhydride or maleic anhydride can be suitably used because these polybasic acid anhydrides themselves are poorly homopolymerizable and can be readily reacted with a hydrophobic group.

The hydrophobic group in the cyclic polybasic acid anhydride (a) is not particularly limited as long as it has hydrophobicity, and examples include hydrocarbon groups, petroleum resins, and coal resins.

The hydrocarbon group may be linear or branched and is preferably linear in view of the hydrophobicity of the cyclic polybasic acid anhydride (a).

The hydrocarbon group preferably has 11 or more carbon atoms, more preferably 15 or more carbon atoms. The hydrocarbon group preferably has 1,500 or less carbon atoms, more preferably 200 or less carbon atoms, still more preferably 30 or less carbon atoms. When the number of carbon atoms in the hydrocarbon group falls within the above range, moderate hydrophobicity can be imparted to the cyclic polybasic acid anhydride (a), thereby allowing the effects of the present invention to be more suitably achieved.

Examples of the hydrocarbon group include alkyl groups, alkenyl groups, and alkynyl groups. Alkenyl groups are more preferred among these because they can impart moderate hydrophobicity to the cyclic polybasic acid anhydride (a).

Examples of the alkenyl group include dodecenyl, hexadecenyl, and octadecenyl groups. Among these, a hexadecenyl or octadecenyl group is preferred because they can impart moderate hydrophobicity to the cyclic polybasic acid anhydride (a).

The cyclic polybasic acid anhydride (a) containing a petroleum resin as the hydrophobic group means that the cyclic polybasic acid anhydride (a) is an acid anhydride group-containing petroleum resin. Moreover, the cyclic polybasic acid anhydride (a) containing a coal resin as the hydrophobic group means that the cyclic polybasic acid anhydride (a) is an acid anhydride group-containing coal resin. The petroleum resin, acid anhydride group-containing petroleum resin, coal resin, and acid anhydride group-containing coal resin will be described later.

Examples of the C15 or higher cyclic polybasic acid anhydride (a) containing the hydrophobic group include C15 or higher cyclic carboxylic acid anhydrides containing hydrocarbon groups, such as dodecenyl succinic anhydride, hexadecenyl succinic anhydride, or octadecenyl succinic anhydride; acid anhydride group-containing petroleum resins and acid anhydride group-containing coal resins.

The type of C15 or higher cyclic polybasic acid anhydride (a) containing a hydrophobic group used may be appropriately selected as a suitable one according to the type of rubber component (C) used in the modified cellulose fiber-containing rubber composition. It is also one of suitable embodiments of the present invention that the cyclic polybasic acid anhydride (a) is at least one selected from the group consisting of acid anhydride group-containing petroleum resins and acid anhydride group-containing coal resins, and more preferably an acid anhydride group-containing petroleum resin.

The acid anhydride group-containing petroleum resin refers to a C15 or higher petroleum resin containing an acid anhydride ring obtained by grafting a cyclic polybasic acid anhydride with a petroleum resin using a known grafting reaction. Moreover, the acid anhydride group-containing coal resin refers to a C15 or higher coal resin containing an acid anhydride ring obtained by grafting a cyclic polybasic acid anhydride with a coal resin similarly using a known grafting reaction.

For example, these resins can be obtained by grafting a petroleum resin or coal resin with a cyclic polybasic acid anhydride (for example, maleic anhydride) using an organic peroxide, followed by purification. An organic solvent which does not react with the cyclic polybasic acid anhydride may be used in the grafting reaction. Whether the resulting product is an acid anhydride group-containing petroleum resin or coal resin can be confirmed by the change in the acid value of the petroleum resin or coal resin before and after the reaction and purification.

Examples of the petroleum resin include C5 petroleum resins, C9 petroleum resins, C5/C9 petroleum resins, dicyclopentadiene resin, and hydrides of the foregoing resins. Each of these may be used alone, or two or more types of these may be used in combination. C5/C9 petroleum resins are particularly preferred among these.

Examples of the coal resin include coumarone resin, coumarone-indene resin, and hydrides of the foregoing resins. Each of these may be used alone, or two or more types of these may be used in combination.

The cyclic polybasic acid anhydride used to obtain the acid anhydride group-containing petroleum resin or acid anhydride group-containing coal resin is not particularly limited as long as it is grafted with a petroleum resin or coal resin to give a petroleum resin or coal resin containing an acid anhydride ring. It may contain a carbon-carbon unsaturated bond to promote the grafting reaction. Examples include carbon-carbon unsaturated bond-containing C4-C10, preferably C4-C6, cyclic carboxylic acid anhydrides such as maleic anhydride, citraconic anhydride, or itaconic anhydride. In view of the grafting reactivity with a petroleum resin or coal resin, maleic anhydride is suitable among these.

Examples of the organic peroxide include t-butyl peroxide, t-butyl peroxypivalate, dilauroyl peroxide, 1,1,3,3-tetramethylbutyl peroxy-2-ethylhexanate, t-butyl peroxy-2-ethylhexanate, dibenzoyl peroxide, t-butyl peroxylaurate, dicumyl peroxide, and di-t-hexyl peroxide. Suitable among these are dialkyl peroxides and dicumyl peroxide. Moreover, examples of the organic solvent include saturated aliphatic hydrocarbons such as hexane, heptane, or octane; saturated alicyclic hydrocarbons such as cyclohexane, methylcyclohexane, ethylcyclohexane, cycloheptane, or methylcycloheptane; aromatic hydrocarbons with no ethylenic double bond such as toluene, xylene, or ethylbenzene; alkylene glycol alkyl ether alkylates such as ethylene glycol monoethyl ether acetate, ethylene glycol monobutyl ether acetate, or propylene glycol monomethyl ether acetate; dialkylene glycol alkyl ether alkylates such as diethylene glycol monoethyl ether acetate or diethylene glycol monobutyl ether acetate; and alkyl alkylates such as ethyl acetate, propyl acetate, butyl acetate, ethyl propionate, propyl propionate, or butyl propionate. Suitable among these are alkyl alkylates, alkylene glycol alkyl ether alkylates and dialkylene glycol alkyl ether alkylates.

The molecular weight of the acid anhydride group-containing petroleum resin or acid anhydride group-containing coal resin is not particularly limited. The acid anhydride group-containing petroleum resin or acid anhydride group-containing coal resin preferably has a polystyrene equivalent weight average molecular weight measured by gel permeation chromatography of 400 to 20,000, more preferably 500 to 9,000, still more preferably 600 to 6,000. When the weight average molecular weight is less than 400, the modified cellulose fiber (A) is not compatible well with rubber, with the result that the rubber composition may fail to simultaneously achieve excellent tensile properties, low energy loss, and excellent rigidity or air permeation resistance. Also, when the weight average molecular weight is more than 20,000, such a resin usually has a higher viscosity and the resulting modified cellulose fiber (A) cannot be readily kneaded with the dispersing polymer (B) and the rubber component (C) and is therefore insufficiently dispersed, with the result that the rubber composition may fail to simultaneously achieve excellent tensile properties, low energy loss, and excellent rigidity or air permeation resistance.

The modified cellulose fiber (A) is obtained by adding a C15 or higher cyclic polybasic acid anhydride (a) containing a hydrophobic group to a cellulose fiber through esterification (modification reaction). The esterification reaction may be carried out by any method, including conventional methods for esterification. For example, either of the methods below may be used. The obtained modified cellulose fiber (A) is usually filtered and washed with water or the like to remove the solvent and catalyst before use in the preparation of a modified cellulose fiber-containing rubber composition.

(I) The C15 or higher cyclic polybasic acid anhydride (a) containing a hydrophobic group is added sequentially or at one time to a dispersion of a cellulose fiber which has preliminarily been subjected to solvent replacement, followed by reaction.

(II) The C15 or higher cyclic polybasic acid anhydride (a) containing a hydrophobic group is melted and then mixed with a cellulose fiber, followed by reaction.

The ratio of the acid anhydride (a) added to the cellulose fiber is preferably 5 to 150% by mass, more preferably 10 to 100% by mass, in view of addition efficiency and affinity with rubber.

The ratio of the acid anhydride (a) added to the cellulose fiber can be calculated as described in the later-mentioned examples.

The dispersing polymer (B) has a softening point of 135° C. or lower as measured by a ring and ball method in accordance with JIS K 2207. If the softening point is higher than 135° C., then the modified cellulose fiber (A) cannot be readily kneaded into the rubber component (C) which forms a matrix in the preparation of a modified cellulose fiber-containing rubber composition, and is therefore insufficiently dispersed, with the result that the rubber composition fails to simultaneously achieve excellent tensile properties, low energy loss, and excellent rigidity or air permeation resistance. Also, when the softening point is lower than 40° C., the rubber composition itself has a lower softening point and therefore may fail to simultaneously achieve excellent tensile properties, low energy loss, and excellent rigidity or air permeation resistance. The dispersing polymer (B) preferably has a softening point of 120° C. or lower, more preferably 110° C. or lower, while in view of dispersibility, the softening point is preferably 40° C. or higher, more preferably 60° C. or higher, still more preferably 80° C. or higher.

The molecular weight of the dispersing polymer (B) is not particularly limited. It preferably has a polystyrene equivalent weight average molecular weight measured by gel permeation chromatography of 400 to 20,000, more preferably 500 to 9,000, still more preferably 600 to 6,000. The dispersing polymer (B) having a weight average molecular weight of less than 400 may cause plasticization of the rubber composition or the formation of air bubbles during forming, with the result that the rubber composition may fail to simultaneously achieve excellent tensile properties, low energy loss, and excellent rigidity or air permeation resistance. Also, when the weight average molecular weight is more than 20,000, such a resin usually has a higher viscosity and thus cannot be readily kneaded with the modified cellulose fiber (A) and the rubber component (C), depending on the composition of the dispersing polymer (B), and therefore the modified cellulose fiber (A) is insufficiently dispersed, with the result that the rubber composition may fail to simultaneously achieve excellent tensile properties, low energy loss, and excellent rigidity or air permeation resistance.

The dispersing polymer (B) is any polymer having the above-mentioned softening point. Examples include petroleum resins, coal resins, terpene resins, and rosin resins. The dispersing polymer (B) is preferably at least one selected from the group consisting of petroleum resins and coal resins, among these. The use of a specific resin which is at least one selected from the group consisting of petroleum resins and coal resins as a dispersing polymer in mixing the modified cellulose fiber (A) and rubber can improve the dispersibility of the cellulose fiber in rubber, with the result that the rubber composition can simultaneously achieve excellent tensile properties, low energy loss, and excellent rigidity or air permeation resistance more suitably. The dispersing polymer (B) is particularly preferably a petroleum resin.

Examples of the petroleum resin include C5 petroleum resins, C9 petroleum resins, C5/C9 petroleum resins, dicyclopentadiene resin, hydrides of the foregoing resins, and modified products of the foregoing resins obtained by (graft) addition of cyclic polybasic acid anhydrides (for example, maleic anhydride). Preferred among these are C9 petroleum resins.

Examples of the coal resin include coumarone resin, coumarone-indene resin, hydrides of the foregoing resins, modified products of the foregoing resins obtained by (graft) addition of cyclic polybasic acid anhydrides (for example, maleic anhydride).

Examples of the terpene resin include α-pinene resin, β-pinene resin, terpene phenolic resin, aromatic modified terpene resins, hydrides of the foregoing resins, and modified products of the foregoing resins obtained by addition of maleic anhydride.

Examples of the rosin resin include gum rosin, wood rosin, tall rosin, hydrogenated rosins prepared from the foregoing rosins, disproportionated rosins, maleic acid-modified rosins, fumaric acid-modified rosins, (meth)acrylic acid-modified rosins, esterified rosins obtained by condensation with alcohols, and phenol-modified rosins.

Among these, the dispersing polymer (B) is particularly preferably a petroleum resin. In view of compatibility, the modified cellulose fiber-containing rubber composition most preferably contains a modified cellulose fiber modified by an acid anhydride group-containing petroleum resin as the modified cellulose fiber (A) and a petroleum resin as the dispersing polymer (B).

Non-limiting examples of the rubber component (C) include rubbers commonly used in the rubber industry, including, for example, natural rubber (NR), modified natural rubbers, and synthetic rubbers such as diene rubbers, e.g. polyisoprene rubber (IR), polybutadiene rubber (BR), styrene-butadiene rubber (SBR), styrene-isoprene-butadiene rubber (SIBR), acrylonitrile butadiene rubber (NBR), or chloroprene rubber (CR); and butyl-based rubbers, e.g. halogenated butyl rubbers (X-IIR) or butyl rubber (IIR). The synthetic rubbers may be modified. The modified natural rubbers include epoxidized natural rubber (ENR), hydrogenated natural rubber, and the like. These materials that can be included in the rubber component may be used alone, or two or more types of these materials may be used in combination.

Thus, it is another suitable embodiment of the present invention that the rubber component (C) is at least one selected from the group consisting of natural rubber, modified natural rubbers, synthetic rubbers, and modified synthetic rubbers.

Any natural rubber may be used, including those commonly used in the tire industry, such as SIR20, RSS#3, or TSR20.

The modified cellulose fiber-containing rubber composition preferably contains the modified cellulose fiber (A) in an amount of 0.01 to 30 parts by mass relative to 100 parts by mass of the rubber component (C). When the amount of the modified cellulose fiber (A) in the modified cellulose fiber-containing rubber composition is less than 0.01 parts by mass relative to 100 parts by mass of the rubber component (C), the effects of the present invention may be insufficiently exerted, while when the modified cellulose fiber (A) is incorporated in an amount of more than 30 parts by mass relative to 100 parts by mass of the rubber component (C), the modified cellulose fiber (A) may have extremely reduced dispersibility in the rubber composition, with the result that the rubber composition may fail to simultaneously achieve excellent tensile properties, low energy loss, and excellent rigidity or air permeation resistance. The modified cellulose fiber-containing rubber composition contains the modified cellulose fiber (A) in an amount of more preferably 0.05 parts by mass or more, still more preferably 0.1 parts by mass or more, but more preferably 20 parts by mass or less, still more preferably 15 parts by mass or less, most preferably 10 parts by mass or less, relative to 100 parts by mass of the rubber component (C).

The modified cellulose fiber-containing rubber composition preferably contains the dispersing polymer (B) in an amount of 0.01 to 30 parts by mass relative to 100 parts by mass of the rubber component (C). When the amount of the dispersing polymer (B) in the modified cellulose fiber-containing rubber composition is less than 0.01 parts by mass relative to 100 parts by mass of the rubber component (C), the effects of the present invention may be insufficiently exerted, while when the dispersing polymer (B) is incorporated in an amount of more than 30 parts by mass relative to 100 parts by mass of the rubber component (C), the percentage of the dispersing polymer (B) in the rubber composition may be excessively large, with the result that the rubber composition may fail to simultaneously achieve excellent tensile properties, low energy loss, and excellent rigidity or air permeation resistance. The modified cellulose fiber-containing rubber composition contains the dispersing polymer (B) in an amount of more preferably 0.05 parts by mass or more, still more preferably 0.1 parts by mass or more, particularly preferably 3 parts by mass or more, but more preferably 20 parts by mass or less, still more preferably 15 parts by mass or less, most preferably 10 parts by mass or less, relative to 100 parts by mass of the rubber component (C).

The ratio of the dispersing polymer (B) relative to the modified cellulose fiber (A) in the modified cellulose fiber-containing rubber composition is preferably 30 to 70% by mass based on 100% by mass in total of the modified cellulose fiber (A) and the dispersing polymer (B). When the ratio of the dispersing polymer (B) relative to the modified cellulose fiber (A) falls within the above range, the dispersibility of the cellulose fiber in rubber can be further improved, with the result that the rubber composition can simultaneously achieve excellent tensile properties, low energy loss, and excellent rigidity or air permeation resistance more suitably. The ratio of the dispersing polymer (B) relative to the modified cellulose fiber (A) is more preferably 35 to 65% by mass, still more preferably 40 to 60% by mass, based on 100% by mass in total of the modified cellulose fiber (A) and the dispersing polymer (B).

The modified cellulose fiber-containing rubber composition can be obtained by kneading the modified cellulose fiber (A), the dispersing polymer (B), and the rubber component (C), and optionally other later-mentioned compounding agents' in for example a rubber kneading machine or the like using conventionally known method and conditions. In particular, preferably, the modified cellulose fiber (A) is preliminarily kneaded with the dispersing polymer (B) before kneading with the rubber component (C) and other compounding agents, and the kneaded mixture (resin composition) is then kneaded with the rubber component (C) and other compounding agents. By preliminarily kneading the modified cellulose fiber (A) with the dispersing polymer (B) to prepare a resin composition, the modified cellulose fiber (A) can be made finer and therefore the dispersibility of the cellulose fiber in rubber can be further improved and the rubber composition can simultaneously achieve excellent tensile properties, low energy loss, and excellent rigidity or air permeation resistance at higher levels; moreover, particularly excellent rigidity can be achieved in the tire radial direction as well as in the tire circumferential direction, and, in addition, processability can be further improved in some cases. Thus, it is another suitable embodiment of the present invention that the modified cellulose fiber-containing rubber composition is obtained by kneading the modified cellulose fiber (A) with the dispersing polymer (B) to give a kneaded mixture (resin composition), and kneading the kneaded mixture with the rubber component (C).

Another aspect of the present invention is a method for producing a modified cellulose fiber-containing rubber composition which includes a modified cellulose fiber (A), a dispersing polymer (B), and a rubber component (C), wherein the modified cellulose fiber (A) is obtained by adding a C15 or higher cyclic polybasic acid anhydride (a) containing a hydrophobic group to a cellulose fiber through esterification, the dispersing polymer (B) has a softening point of 135° C. or lower, and the production method includes the step of kneading the modified cellulose fiber (A), the dispersing polymer (B), and the rubber component (C). It is still another suitable embodiment of the present invention that the production method includes the steps of kneading the modified cellulose fiber (A) with the dispersing polymer (B) to give a kneaded mixture, and kneading the kneaded mixture with the rubber component (C) to give a modified cellulose fiber-containing rubber composition.

As described above, the modified cellulose fiber-containing rubber composition is preferably obtained by kneading the modified cellulose fiber (A) with the dispersing polymer (B) to give a kneaded mixture (resin composition), and kneading the kneaded mixture with the rubber component (C). The percentage of the modified cellulose fiber (A) from the resin composition per 100% by mass of the modified cellulose fiber (A) contained in the modified cellulose fiber-containing rubber composition is more preferably 40% by mass or more, still more preferably 60% by mass or more, particularly preferably 80% by mass or more. The upper limit of the percentage is not particularly limited and may be 100% by mass.

The percentage of the dispersing polymer (B) from the resin composition per 100% by mass of the dispersing polymer (B) contained in the modified cellulose fiber-containing rubber composition is more preferably 40% by mass or more, still more preferably 60% by mass or more, particularly preferably 80% by mass or more. The upper limit of the percentage is not particularly limited and may be 100% by mass.

As described above, when the modified cellulose fiber (A) is preliminarily kneaded with the dispersing polymer (B), the step of kneading the modified cellulose fiber (A) with the dispersing polymer (B) may be carried out by any method that can knead the modified cellulose fiber (A) with the dispersing polymer (B), including conventional kneading methods. For example, a preferred step is such that in a kneading machine, the modified cellulose fiber (A) is dispersed in the dispersing polymer (B) and stirred and mixed under a high shear force so that the modified cellulose fiber (A) is made finer. Non-limiting examples of kneading machines that can be used in the kneading step include two-roll mills, three-roll mills, single-screw kneading extruders, twin-screw kneading extruders, Banbury mixers, and pressure kneaders. Each of these kneading machines may be used alone, or two or more types of these kneading machines may be used in combination. To promote making the modified cellulose fiber (A) finer, it is preferred to use a twin-screw kneading extruder, a Banbury mixer, or a pressure kneader.

The kneading conditions in the step of kneading the modified cellulose fiber (A) with the dispersing polymer (B), such as kneading temperature and kneading time, may be appropriately chosen so that the modified cellulose fiber (A) is sufficiently kneaded with the dispersing polymer (B) to make the modified cellulose fiber (A) finer.

In the step of kneading the modified cellulose fiber (A) with the dispersing polymer (B), some of other compounding agents that can be added to the modified cellulose fiber-containing rubber composition, lubricants such as stearic acid, antioxidants, or the like may be added in addition to the modified cellulose fiber (A) and the dispersing polymer (B), as long as they do not inhibit the progress of making the modified cellulose fiber (A) finer. The combined amount of the modified cellulose fiber (A) and the dispersing polymer (B) based on 100% by mass of the kneaded mixture (resin composition) obtained by the kneading step is preferably 80% by mass or more, more preferably 90% by mass or more, still more preferably 93% by mass or more, particularly preferably 95% by mass or more, while the upper limit is not particularly limited and may be 100% by mass.

The addition of the lubricant to the extent that does not affect the effects of the present invention facilitates the separation of the kneaded mixture of the modified cellulose fiber (A) and the dispersing polymer (B) from the kneading machine or die and therefore formability or workability may be improved. Non-limiting examples of the lubricant include hydrocarbon lubricants such as paraffin wax or polyethylene wax; fatty acid lubricants such as stearic acid, behenic acid, or 12-hydroxystearic acid; and aliphatic amide lubricants such as stearic acid amide, oleic acid amide, or erucic acid amide. When a lubricant is added to the resin composition, for example, as in the case of a resin composition containing the modified cellulose fiber (A), the dispersing polymer (B), a lubricant, and other compounding agents, the amount of the lubricant relative to 100% by mass of the total resin composition is preferably 1% by mass or more, more preferably 3% by mass or more, while it is preferably 20% by mass or less, more preferably 10% by mass or less, particularly preferably 7% by mass or less.

The addition of the antioxidant to the extent that does not affect the effects of the present invention may slow down thermal aging of the modified cellulose fiber in the step of kneading the modified cellulose fiber (A) with the dispersing polymer (B). Non-limiting examples of the antioxidant include phenolic antioxidants such as ADK STAB AO series available from Adeka Corporation, e.g. AO-20, AO-30, AO-40, AO-50, or AO-60. When an antioxidant is added to the resin composition, for example, as in the case of a resin composition containing the modified cellulose fiber (A), the dispersing polymer (B), an antioxidant, and other compounding agents, the amount of the antioxidant relative to 100% by mass of the total resin composition is preferably 0.1% by mass or more, more preferably 0.5% by mass or more, while it is preferably 10% by mass or less, more preferably 3% by mass or less.

The modified cellulose fiber-containing rubber composition may contain other components as long as it contains the modified cellulose fiber (A), the dispersing polymer (B), and the rubber component (C) and the effects of the present invention are not impaired. For example, resins having a softening point of higher than 135° C. which do not correspond to the dispersing polymer (B) may be used in admixture with the dispersing polymer (B). When such a resin is used in admixture with the dispersing polymer (B), the amount of the resin based on the combined amount of the resin and the dispersing polymer (B) is preferably 50% by mass or less.

In addition to the modified cellulose fiber (A), the dispersing polymer (B), and the rubber component (C), the modified cellulose fiber-containing rubber composition may optionally contain other compounding agents conventionally used in the rubber industry, including, for example, reinforcing agents such as carbon black or silica, oil, age resisters, zinc oxide, stearic acid, silane coupling agents, curable resins, wax, vulcanizing agents, and vulcanization accelerators.

The modified cellulose fiber-containing rubber composition can be prepared by conventional methods. Specifically, it can be prepared by kneading the components using a rubber kneading machine, such as a Banbury mixer, a kneader, or an open roll mill, and vulcanizing the kneaded mixture.

The pneumatic tire according to the first aspect of the invention includes a sidewall formed from the above-described modified cellulose fiber-containing rubber composition.

The pneumatic tire according to the second aspect of the invention includes a base tread formed from the above-described modified cellulose fiber-containing rubber composition.

The base tread refers to an inner layer of a multilayer tread. In the case of a tread composed of two layers (an outer surface layer (cap tread) and an inner surface layer (base tread)), the base tread corresponds to the inner surface layer. Specifically, the base tread is a tire component shown in, for example, FIG. 1 of JP 2008-285628 A and FIG. 1 of JP 2008-303360 A, which are incorporated herein by reference.

The pneumatic tire according to the third aspect of the invention includes a breaker topping formed from the above-described modified cellulose fiber-containing rubber composition.

The breaker topping is used as a steel cord topping. Examples of the steel cord include 1×n single strand steel cords and k+m layer strand steel cords, where for example n represents an integer of 1 to 27, k represents an integer of 1 to 10, and m represents an integer of 1 to 3. The breaker topping is used in a breaker which is placed inside a tread and radially outside of a carcass. Specifically, the breaker topping can be used for breakers shown in, for example, FIG. 3 of JP 2003-94918 A, FIG. 1 of JP 2004-67027 A, and FIGS. 1 to 4 of JP H04-356205 A, all of which are incorporated herein by reference.

The pneumatic tire according to the fourth aspect of the invention includes an innerliner formed from the above-described modified cellulose fiber-containing rubber composition.

The innerliner refers to a tire component configured to form an inner cavity surface of a tire. This tire component reduces air permeation to maintain the internal pressure of a tire. Specifically, the innerliner is a tire component shown in, for example, FIG. 1 of JP 2008-291091 A and FIGS. 1 and 2 of JP 2007-160980 A, which are incorporated herein by reference.

The pneumatic tire according to the fifth aspect of the invention includes at least one tire component selected from the group consisting of a bead apex, a clinch apex, a ply topping, and a tread each formed from the above-described modified cellulose fiber-containing rubber composition.

The bead apex refers to a tire component placed inside a tire clinch to extend radially outwardly from a bead core. Specifically, the bead apex is a tire component shown in, for example, FIGS. 1 to 3 of JP 2008-38140 A and FIG. 1 of JP 2004-339287 A, which are incorporated herein by reference.

The clinch apex refers to a rubber portion placed at the inner end of a sidewall. Specifically, the clinch apex is a tire component shown in, for example, FIG. 1 of JP 2008-75066 A and FIG. 1 of JP 2004-106796 A, which are incorporated herein by reference.

The ply topping refers to a tire component that coats cords in a carcass ply or a belt ply.

The run-flat tire according to the sixth aspect of the invention includes a lining strip layer formed from the above-described modified cellulose fiber-containing rubber composition.

The lining strip layer refers to a sidewall-reinforcing layer placed inside of a sidewall portion. Specific examples include a crescentic reinforcing rubber layer gradually decreasing in thickness toward both ends and extending from a bead portion to a shoulder portion while being in contact with the inside of a carcass ply; a reinforcing rubber layer placed between the main body of a carcass ply and its folded portion and extending from a bead portion to a tread portion; and a two-layer reinforcing rubber layer placed between a plurality of carcass plies or reinforcing plies. Specifically, the lining strip layer is a tire component shown in, for example, FIG. 1 of JP 2007-326559 A and FIG. 1 of JP 2004-330822 A, which are incorporated herein by reference.

The tire components are described below.

<Sidewall>

According to the first aspect of the invention in which a sidewall is formed from the modified cellulose fiber-containing rubber composition, the rubber component (C) preferably includes both natural rubber and polybutadiene rubber (BR) because these rubbers provide good flex crack growth resistance.

The amount of natural rubber based on 100% by mass of the rubber component (C) is preferably 5% by mass or more, more preferably 20% by mass or more, still more preferably 30% by mass or more. When the amount is less than 5% by mass, excellent fuel economy may not be obtained. The amount is also preferably 80% by mass or less, more preferably 60% by mass or less, still more preferably 50% by mass or less. When the amount exceeds 80% by mass, flex crack growth resistance may be reduced.

Any BR may be used, including those generally known in the tire industry, such as polybutadiene rubber having a high cis content, e.g. BR1220 available from Zeon Corporation, and BR130B and BR150B available from Ube Industries, Ltd., modified polybutadiene rubber e.g. BR1250H available from Zeon Corporation, polybutadiene rubber containing syndiotactic polybutadiene crystals, e.g. VCR412 and VCR617 available from Ube Industries, Ltd., and polybutadiene rubber synthesized using a rare earth catalyst, e.g. BUNA-CB25 available from LANXESS. Each of these BRs may be used alone, or two or more types thereof may be used in combination.

The cis content in the BR is preferably 70% by mass or more, more preferably 90% by mass or more, still more preferably 97% by mass or more.

In the present invention, the cis content (percentage of cis-1,4 linkages) in the BR can be measured by infrared absorption spectrometry.

The molecular weight distribution (Mw/Mn) of the BR is preferably 1.5 or higher, more preferably 2.0 or higher. When the Mw/Mn is lower than 1.5, processability may be deteriorated. The Mw/Mn of the BR is preferably 5.0 or lower, more preferably 4.0 or lower. When the Mw/Mn exceeds 5.0, flex crack growth resistance tends to be deteriorated.

In the present invention, the number average molecular weight (Mn) and the weight average molecular weight (Mw) are determined using gel permeation chromatography (GPC) relative to polystyrene standards.

The Mooney viscosity ($ML_{1+4}$ (100° C.)) of the BR is preferably 10 or more, more preferably 30 or more. When the Mooney viscosity is less than 10, the dispersibility of filler tends to be reduced. The Mooney viscosity is preferably 120 or less, more preferably 80 or less. When the Mooney viscosity exceeds 120, compound scorch (discoloration) may occur during extrusion processing.

In the present invention, the Mooney viscosity of the BR is measured in accordance with ISO289 or JIS K 6300.

In view of achieving required fuel economy and flex crack growth resistance, the amount of BR based on 100% by mass of the rubber component (C) is preferably 30% by mass or more, more preferably 40% by mass or more, still more preferably 50% by mass or more. In view of processability, the amount of BR is also preferably 90% by mass or less, more preferably 80% by mass or less, still more preferably 70% by mass or less.

The modified cellulose fiber (A) and the dispersing polymer (B) in the modified cellulose fiber-containing rubber composition in the first aspect of the invention may be as described above and can be used in amounts as specified above.

Non-limiting examples of carbon black that may be contained in the modified cellulose fiber-containing rubber composition in the first aspect of the invention include GPF, FEF, HAF, ISAF, and SAF. The above carbon black may be used alone or in combinations of two or more types.

The carbon black preferably has a nitrogen adsorption specific surface area ($N_2SA$) of 20 $m^2/g$ or more, more preferably 30 $m^2/g$ or more. The $N_2SA$ of the carbon black is also preferably 200 $m^2/g$ or less, more preferably 150 $m^2/g$ or less, still more preferably 100 $m^2/g$ or less. Carbon black with a $N_2SA$ of less than 20 $m^2/g$ tends not to produce a sufficient reinforcing effect. When the carbon black has a $N_2SA$ of more than 200 $m^2/g$, fuel economy tends to be reduced.

The amount of carbon black relative to 100 parts by mass of the rubber component (C) is preferably 1 part by mass or more, more preferably 2 parts by mass or more. The amount of carbon black is preferably 150 parts by mass or less, more preferably 100 parts by mass or less. When the amount falls within the above range, good fuel economy and good flex crack growth resistance can be obtained.

The modified cellulose fiber-containing rubber composition in the first aspect of the invention may contain a white filler. Examples of the white filler include those commonly used in the rubber industry, for example, silica, calcium carbonate, mica such as sericite, aluminum hydroxide, magnesium oxide, magnesium hydroxide, clay, talc, alumina, and titanium oxide. Silica is preferred in view of fuel economy.

Non-limiting examples of the silica include dry silica (anhydrous silicic acid) and wet silica (hydrous silicic acid). Preferred is wet silica as it has many silanol groups.

The silica preferably has a nitrogen adsorption specific surface area ($N_2SA$) of 40 $m^2/g$ or more, more preferably 50 m²/g or more. When the $N_2SA$ is less than 40 m²/g, tensile strength after vulcanization tends to be reduced. Also, the silica preferably has a $N_2SA$ of 300 m²/g or less, more preferably 250 m²/g or less. When the $N_2SA$ is more than 300 m²/g, low heat build-up properties or rubber processability tends to be reduced.

In the present invention, the nitrogen adsorption specific surface area of silica is determined by the BET method in accordance with ASTM D3037-93.

The amount of white filler (in particular, silica) relative to 100 parts by mass of the rubber component (C) is preferably 10 parts by mass or more, more preferably 20 parts by mass or more. The amount of white filler is also preferably 120 parts by mass or less, more preferably 100 parts by mass or less. When the amount of white filler falls within the above range, good fuel economy and good flex crack growth resistance can be obtained.

In the case of the modified cellulose fiber-containing rubber composition in the first aspect of the invention which contains silica, the rubber composition preferably further contains a silane coupling agent. Non-limiting examples of the silane coupling agent include sulfide silane coupling agents such as bis(3-triethoxysilylpropyl)disulfide or bis(3-triethoxysilylpropyl)tetrasulfide; mercapto silane coupling agents such as 3-mercaptopropyltrimethoxysilane or 3-mercaptopropyltriethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Each of these silane coupling agents may be used alone, or two or more types thereof may be used in combination.

The amount of silane coupling agent relative to 100 parts by mass of silica is preferably 0.5 parts by mass or more, more preferably 1.5 parts by mass or more, still more preferably 2.5 parts by mass or more. When the amount is less than 0.5 parts by mass, silica may be less likely to be dispersed well. The amount of silane coupling agent is also preferably 20 parts by mass or less, more preferably 15 parts by mass or less, still more preferably 10 parts by mass or less. When the amount exceeds 20 parts by mass, the effect of improving dispersion of silica tends not to increase and therefore cost tends to unnecessarily increase. In addition, scorch time tends to be reduced, thereby reducing processability during kneading or extrusion.

The modified cellulose fiber-containing rubber composition in the first aspect of the invention preferably contains oil as a plasticizer. The addition of oil can adjust hardness so as to be appropriately low, thereby resulting in good processability. Non-limiting examples of the oil include conventionally known oils, including process oils such as paraffinic process oils, aromatic process oils, or naphthenic process oils, vegetable fats and oils, and mixtures of the foregoing oils.

The amount of oil relative to 100 parts by mass of the rubber component (C) is preferably 1 part by mass or more, more preferably 2 parts by mass or more, while it is preferably 15 parts by mass or less, more preferably 10 parts by mass or less. When the amount falls within the above range, good processability can be imparted and, further, excellent fuel economy and excellent flex crack growth resistance can be obtained.

Examples of age resisters that may be contained in the modified cellulose fiber-containing rubber composition in the first aspect of the invention include diphenylamine age resisters such as p-(p-toluenesulfonyl amide)diphenylamine or octylated diphenylamine; and p-phenylenediamine age resisters such as N-(1,3-dimethylbutyl)-N'-phenyl-p-phenylenediamine (6PPD), N-phenyl-N'-isopropyl-p-phenylenediamine (IPPD), or N,N'-di-2-naphthyl-p-phenylenediamine.

Examples of vulcanization accelerators that may be contained in the modified cellulose fiber-containing rubber composition in the first aspect of the invention include thiazole vulcanization accelerators such as 2-mercaptobenzothiazole, dibenzothiazolyl disulfide, or N-cyclohexyl-2-benzothiazolylsulfenamide; thiuram vulcanization accelerators such as tetramethylthiuram monosulfide or tetramethylthiuram disulfide; sulfenamide vulcanization accelerators such as N-cyclohexyl-2-benzothiazole sulfenamide, N-t-butyl-2-benzothiazole sulfenamide, N-oxyethylene-2-benzothiazole sulfenamide, N,N'-dicyclohexyl-2-benzothiazole sulfenamide, or N,N'-diisopropyl-2-benzothiazole sulfenamide; and guanidine vulcanization accelerators such as diphenyl guanidine, di-ortho-tolyl guanidine, or ortho-tolyl biguanidine. The amount of vulcanization accelerator relative to 100 parts by mass of the rubber component (C) is preferably 0.1 to 5 parts by mass, more preferably 0.2 to 3 parts by mass.

The modified cellulose fiber-containing rubber composition in the first aspect of the invention preferably contains sulfur as a vulcanizing agent. Examples of the sulfur include powdered sulfur, precipitated sulfur, colloidal sulfur, insoluble sulfur, and highly dispersible sulfur. The amount of sulfur relative to 100 parts by mass of the rubber component (C) is preferably 1 part by mass or more, more preferably 1.5 parts by mass or more. When the amount is less than 1 part by mass, the effect of sulfur may be low. Also, the amount is preferably 6 parts by mass or less, more preferably 4 parts by mass or less. When the amount exceeds 6 parts by mass, the effect of suppressing hardening deterioration may be insufficient.

<Base Tread>

According to the second aspect of the invention in which a base tread is formed from the modified cellulose fiber-containing rubber composition, the rubber component (C) preferably includes both natural rubber and polybutadiene rubber (BR) because these rubbers provide good fuel economy and good handling stability.

The amount of natural rubber based on 100% by mass of the rubber component (C) is preferably 5% by mass or more, more preferably 30% by mass or more, still more preferably 50% by mass or more, particularly preferably 60% by mass or more. When the amount is less than 5% by mass, excellent fuel economy may not be obtained. Also, the amount of natural rubber is preferably 90% by mass or less, more preferably 80% by mass or less, still more preferably 75% by mass or less. When the amount exceeds 90% by mass, handling stability may be reduced.

The BR used may be as described in the first aspect of the invention.

The molecular weight distribution (Mw/Mn) of the BR is preferably 1.5 or higher, more preferably 2.0 or higher. When the Mw/Mn is lower than 1.5, processability may be deteriorated. The Mw/Mn of the BR is preferably 5.0 or lower, more preferably 4.0 or lower. When the Mw/Mn exceeds 5.0, handling stability tends to be deteriorated.

The Mooney viscosity ($ML_{1+4}$ (100° C.)) of the BR is as described in the first aspect of the invention.

In view of achieving required fuel economy and handling stability, the amount of BR based on 100% by mass of the rubber component (C) is preferably 10% by mass or more, more preferably 20% by mass or more. In view of processability, the amount of BR is also preferably 70% by mass or less, more preferably 50% by mass or less, still more preferably 40% by mass or less.

The modified cellulose fiber (A) and the dispersing polymer (B) in the modified cellulose fiber-containing rubber composition in the second aspect of the invention may be as described above and can be used in amounts as specified above.

Examples of carbon black that may be contained in the modified cellulose fiber-containing rubber composition in the second aspect of the invention include those described in the first aspect of the invention.

The amount of carbon black relative to 100 parts by mass of the rubber component (C) is preferably 1 part by mass or more, more preferably 2 parts by mass or more, while it is preferably 150 parts by mass or less, more preferably 100 parts by mass or less. When the amount falls within the above range, good fuel economy and good handling stability can be obtained.

The modified cellulose fiber-containing rubber composition in the second aspect of the invention may contain a white filler. The same white fillers as described in the first aspect of the invention can be used.

The amount of white filler (in particular, silica) relative to 100 parts by mass of the rubber component (C) is preferably 10 parts by mass or more, more preferably 20 parts by mass or more, while it is preferably 120 parts by mass or less, more preferably 100 parts by mass or less. When the amount falls within the above range, good fuel economy and good handling stability can be obtained.

In the case of the modified cellulose fiber-containing rubber composition in the second aspect of the invention which contains silica, the rubber composition preferably further contains a silane coupling agent. The silane coupling agent used may be as described in the first aspect of the invention and can be used in an amount as specified in the first aspect of the invention.

The modified cellulose fiber-containing rubber composition in the second aspect of the invention preferably contains oil as a plasticizer. The addition of oil can adjust hardness so as to be appropriately low, thereby resulting in good processability. The same oils as described in the first aspect of the invention can be used.

The amount of oil relative to 100 parts by mass of the rubber component (C) is preferably 1 part by mass or more, more preferably 2 parts by mass or more, while it is preferably 15 parts by mass or less, more preferably 10 parts by mass or less. When the amount falls within the above range, good processability can be imparted and, further, excellent fuel economy and excellent handling stability can be obtained.

Examples of age resisters that may be contained in the modified cellulose fiber-containing rubber composition in the second aspect of the invention include those described in the first aspect of the invention.

Examples of vulcanization accelerators that may be contained in the modified cellulose fiber-containing rubber composition in the second aspect of the invention include those described in the first aspect of the invention, which can be used in an amount as specified in the first aspect of the invention.

The modified cellulose fiber-containing rubber composition in the second aspect of the invention may suitably contain sulfur as a vulcanizing agent. The sulfur used may be as described in the first aspect of the invention and can be used in an amount as specified in the first aspect of the invention.

<Breaker Topping>

According to the third aspect of the invention in which a breaker topping is formed from the modified cellulose fiber-containing rubber composition, the rubber component (C) preferably includes natural rubber because it provides good breaking properties (tensile strength).

The amount of natural rubber based on 100% by mass of the rubber component (C) is preferably 5% by mass or more, more preferably 10% by mass or more, still more preferably 20% by mass or more, particularly preferably 50% by mass or more, most preferably 80% by mass or more, while the upper limit of the amount is not particularly limited and may be 100% by mass. When the amount is less than 5% by mass, excellent fuel economy and excellent rubber strength may not be obtained.

The modified cellulose fiber (A) and the dispersing polymer (B) in the modified cellulose fiber-containing rubber composition in the third aspect of the invention may be as described above and can be used in amounts as specified above.

Examples of carbon black that may be contained in the modified cellulose fiber-containing rubber composition in the third aspect of the invention include those described in the first aspect of the invention.

The amount of carbon black relative to 100 parts by mass of the rubber component (C) is preferably 10 parts by mass or more, more preferably 15 parts by mass or more. The amount of carbon black is preferably 100 parts by mass or less, more preferably 80 parts by mass or less, still more preferably 70 parts by mass or less. When the amount is less than 10 parts by mass, sufficient reinforcing properties tend not to be obtained. When the amount exceeds 100 parts by mass, heat build-up increases so that fuel economy tends to be deteriorated.

The modified cellulose fiber-containing rubber composition in the third aspect of the invention may contain a white filler. The same white fillers as described in the first aspect of the invention can be used.

The amount of white filler (in particular, silica) relative to 100 parts by mass of the rubber component (C) is preferably 10 parts by mass or more, more preferably 20 parts by mass or more, while it is preferably 120 parts by mass or less, more preferably 100 parts by mass or less. When the amount falls within the above range, good fuel economy can be obtained.

In the case of the modified cellulose fiber-containing rubber composition in the third aspect of the invention which contains silica, the rubber composition preferably further contains a silane coupling agent. The silane coupling agent used may be as described in the first aspect of the invention and can be used in an amount as specified in the first aspect of the invention.

The modified cellulose fiber-containing rubber composition in the third aspect of the invention preferably contains an organic acid cobalt salt. Since the organic acid cobalt salt serves to crosslink cords (steel cords) to rubber, the addition of this component improves adhesion between cords and the rubber.

Examples of the organic acid cobalt salt include cobalt stearate, cobalt naphthenate, cobalt neodecanoate, and cobalt boron 3 neodecanoate. Among these, cobalt stearate or cobalt naphthenate is preferred.

The amount of organic acid cobalt salt, calculated as cobalt metal, relative to 100 parts by mass of the rubber component (C) is preferably 0.05 parts by mass or more, more preferably 0.08 parts by mass or more. When the amount is less than 0.05 parts by mass, the adhesion between the plated layer of steel cords and the rubber may be insufficient. The amount of organic acid cobalt salt is also preferably 0.5 parts by mass or less, more preferably 0.3 parts by mass or less, still more preferably 0.2 parts by mass or less. When the amount exceeds 0.5 parts by mass, the rubber tends to be oxidatively degraded markedly and show deteriorated tensile properties.

The modified cellulose fiber-containing rubber composition in the third aspect of the invention preferably contains zinc oxide. The addition of zinc oxide improves adhesion between the plated layer of steel cords and the rubber. Zinc oxide also functions as a vulcanization activator for rubber. Furthermore, zinc oxide is effective for preventing scorch.

The amount of zinc oxide relative to 100 parts by mass of the rubber component (C) is preferably 2 parts by mass or more, more preferably 5 parts by mass or more, still more preferably 6 parts by mass or more. An amount of less than 2 parts by mass may result in insufficient adhesion between the plated layer of steel cords and the rubber, or insufficient vulcanization of the rubber. The amount of zinc oxide is also preferably 25 parts by mass or less, more preferably 20 parts by mass or less, still more preferably 15 parts by mass or less. An amount of more than 25 parts by mass may reduce rubber strength.

The modified cellulose fiber-containing rubber composition in the third aspect of the invention preferably contains sulfur as a vulcanizing agent. The same sulfurs as described in the first aspect of the invention can be used.

The amount of sulfur relative to 100 parts by mass of the rubber component (C) is preferably 2 parts by mass or more, more preferably 3 parts by mass or more, still more preferably 4 parts by mass or more. When the amount is less than 2 parts by mass, sufficient crosslink density may not be achieved and adhesion performance may be deteriorated. Also, the amount is preferably 10 parts by mass or less, more preferably 8 parts by mass or less, still more preferably 6 parts by mass or less. When the amount exceeds 10 parts by mass, thermal aging resistance may be deteriorated.

Examples of vulcanization accelerators that may be contained in the modified cellulose fiber-containing rubber composition in the third aspect of the invention include sulfenamide vulcanization accelerators, thiazole vulcanization accelerators, thiuram vulcanization accelerators, thiourea vulcanization accelerators, guanidine vulcanization accelerators, dithiocarbamate vulcanization accelerators, aldehyde-amine or aldehyde-ammonia vulcanization accelerators, imidazoline vulcanization accelerators, and xanthate vulcanization accelerators. Among these, sulfenamide vulcanization accelerators are preferred because they provide excellent scorch properties.

Examples of the sulfenamide vulcanization accelerator include N-tert-butyl-2-benzothiazolylsulfenamide (TBBS), N-cyclohexyl-2-benzothiazolylsulfenamide (CBS), and N,N'-dicyclohexyl-2-benzothiazolylsulfenamide (DZ).

The amount of vulcanization accelerator to be used relative to 100 parts by mass of the rubber component (C) is preferably 0.1 to 5 parts by mass, more preferably 0.2 to 3 parts by mass.

Examples of age resisters that may be contained in the modified cellulose fiber-containing rubber composition in the third aspect of the invention include amine-ketone age resisters, amine age resisters, phenolic age resisters, imidazole age resisters, and thiourea age resisters. Each of these age resisters may be used alone, or two or more types thereof may be used in combination. Among these, amine age resisters are preferred because they provide excellent breaking properties and excellent heat resistance.

Examples of the amine age resister include amine derivatives such as diphenylamine derivatives and p-phenylenediamine derivatives. Examples of diphenylamine derivatives include p-(p-toluenesulfonyl amide)diphenylamine and octylated diphenylamine. Examples of p-phenylenediamine derivatives include N-(1,3-dimethylbutyl)-N'-phenyl-p-phenylenediamine (6PPD), N-phenyl-N'-isopropyl-p-phenylenediamine (IPPD), and N,N'-di-2-naphthyl-p-phenylenediamine.

The amount of age resister relative to 100 parts by mass of the rubber component (C) is preferably 1 part by mass or more, more preferably 1.3 parts by mass or more. When the amount is less than 1 part by mass, breaking properties may not be improved. The amount of age resister is also preferably 6 parts by mass or less, more preferably 4 parts by mass or less, still more preferably 2 parts by mass or less. When the amount exceeds 6 parts by mass, the age resister may bloom to the surface, resulting in reduced rubber properties. Since the modified cellulose fiber-containing rubber composition is excellent in thermal aging resistance, it can show sufficient durability even when the amount of age resister is 2 parts by mass or less.

Examples of oil that may be contained in the modified cellulose fiber-containing rubber composition in the third aspect of the invention include process oils, vegetable fats and oils, and mixtures of the foregoing oils. Examples of process oils include paraffinic process oils, naphthenic process oils, and aromatic process oils.

The amount of oil relative to 100 parts by mass of the rubber component (C) is preferably 0.5 parts by mass or more, more preferably 1 part by mass or more, while it is preferably 10 parts by mass or less, more preferably 8 parts by mass or less, still more preferably 6 parts by mass or less. When the amount does not fall within the above range, hygrothermal peeling resistance or durability may not be sufficiently improved.

<Innerliner>

According to the fourth aspect of the invention in which an innerliner is formed from the modified cellulose fiber-containing rubber composition, the rubber component (C) preferably includes both natural rubber and a butyl-based rubber because these rubbers provide good air permeation resistance.

The amount of natural rubber based on 100% by mass of the rubber component (C) is preferably 5% by mass or more, more preferably 10% by mass or more, still more preferably 20% by mass or more. When the amount is less than 5% by mass, excellent fuel economy and excellent rubber strength may not be obtained. The upper limit of the amount is not particularly limited and is preferably 70% by mass or less, more preferably 50% by mass or less, still more preferably 40% by mass or less.

Examples of the butyl-based rubber include halogenated butyl rubbers (X-IIR) such as brominated butyl rubber (Br-IIR) or chlorinated butyl rubber (Cl-IIR), and butyl rubber (IIR). Each of the butyl-based rubbers may be used alone, or two or more types thereof may be used in combination. In view of low heat build-up properties, X-IIR such as Cl-IIR is preferred among these.

The amount of butyl-based rubber based on 100% by mass of the rubber component (C) is preferably 50% by mass or more, more preferably 60% by mass or more, still more preferably 70% by mass or more. When the amount is less than 50% by mass, excellent air permeation resistance may not be obtained. The amount of butyl-based rubber is also preferably 99% by mass or less, more preferably 90% by mass or less, still more preferably 80% by mass or less. When the amount exceeds 99% by mass, good fuel economy may not be obtained.

The rubber component (C) preferably includes epoxidized natural rubber (ENR).

The ENR to be used may be a commercial product or may be prepared by epoxidizing NR. NR may be epoxidized by any method such as a chlorohydrin method, a direct oxidation method, a hydrogen peroxide method, an alkylhydroperoxide method, or a peracid method. The peracid method may be carried out, for example, by reacting a natural rubber emulsion with an organic peracid such as peracetic acid or performic acid as an epoxidizing agent.

The ENR preferably has an epoxidation degree of 1 to 85 mol %. ENR with an epoxidation degree of less than 1 mol % tends to be less effective in modifying the rubber composition. Also, when the epoxidation degree is more than 85 mol %, the polymers in the rubber composition tend to form a gel.

The epoxidation degree is defined as the ratio of the number of epoxidized carbon-carbon double bonds to the number of total carbon-carbon double bonds in the natural rubber before epoxidation, and it may be determined by, for example, titrimetric analysis or nuclear magnetic resonance (NMR).

When ENR is contained, the amount of ENR based on 100% by mass of the rubber component (C) is preferably 10% by mass or more, more preferably 20% by mass or more, while it is preferably 99% by mass or less, more preferably 90% by mass or less, still more preferably 70% by mass or less. When the amount is less than 10% by mass, the effect of dispersing filler in the rubber composition tends to be reduced. When the amount exceeds 99% by mass, good processability and good tensile strength may not be obtained.

The modified cellulose fiber (A) and the dispersing polymer (B) in the modified cellulose fiber-containing rubber composition in the fourth aspect of the invention may be as described above and can be used in amounts as specified above.

Non-limiting examples of carbon black that may be contained in the modified cellulose fiber-containing rubber composition in the fourth aspect of the invention include GPF, FEF, HAF, ISAF, and SAF. The above carbon black may be used alone or in combinations of two or more types.

The carbon black preferably has a nitrogen adsorption specific surface area ($N_2SA$) of 10 $m^2/g$ or more, more preferably 20 $m^2/g$ or more, still more preferably 23 $m^2/g$ or more. The $N_2SA$ is also preferably 250 $m^2/g$ or less, more preferably 100 $m^2/g$ or less, still more preferably 50 $m^2/g$ or less, particularly preferably 35 $m^2/g$ or less. When the $N_2SA$ is less than 10 $m^2/g$, sufficient adhesion or rubber strength may not be obtained. When the $N_2SA$ is more than 250 $m^2/g$, the unvulcanized rubber composition tends to have a very high viscosity, thereby deteriorating processability. In addition, fuel economy also tends to be deteriorated.

The amount of carbon black relative to 100 parts by mass of the rubber component (C) is preferably 5 parts by mass or more, more preferably 20 parts by mass or more, still more preferably 30 parts by mass or more, while it is preferably 100 parts by mass or less, more preferably 80 parts by mass or less, still more preferably 60 parts by mass or less. When the amount is less than 5 parts by mass, sufficient abrasion resistance, adhesion, or rubber strength may not be obtained. When the amount exceeds 100 parts by mass, dispersibility or processability tends to be deteriorated.

The modified cellulose fiber-containing rubber composition in the fourth aspect of the invention may contain a white filler. The same white fillers as described in the first aspect of the invention can be used.

The white filler (in particular, silica) can be used in an amount as specified in the third aspect of the invention.

In the case of the modified cellulose fiber-containing rubber composition in the fourth aspect of the invention which contains silica, the rubber composition preferably further contains a silane coupling agent. The silane coupling agent may be as described in the first aspect of the invention and can be used in an amount as specified in the first aspect of the invention.

Examples of age resisters that may be contained in the modified cellulose fiber-containing rubber composition in the fourth aspect of the invention include those described in the first aspect of the invention.

Examples of vulcanization accelerators that may be contained in the modified cellulose fiber-containing rubber composition in the fourth aspect of the invention include those described in the first aspect of the invention, which can be used in an amount as specified in the first aspect of the invention.

The modified cellulose fiber-containing rubber composition in the fourth aspect of the invention may suitably contain sulfur as a vulcanizing agent. The same sulfurs as described in the first aspect of the invention can be used.

The amount of sulfur relative to 100 parts by mass of the rubber component (C) is preferably 1 part by mass or more. When the amount is less than 1 part by mass, the effect of sulfur may be low. Also, the amount is preferably 6 parts by mass or less, more preferably 4 parts by mass or less. When the amount exceeds 6 parts by mass, the effect of suppressing hardening deterioration may be insufficient.

<Bead Apex>

When a bead apex is formed from the modified cellulose fiber-containing rubber composition according to the fifth aspect of the invention, the rubber component (C) used may be as described above. The rubber component (C) preferably includes both natural rubber and styrene-butadiene rubber (SBR) because the use of these rubbers is economically advantageous and adhesion performance to adjacent tire components is ensured.

The amount of natural rubber based on 100% by mass of the rubber component (C) is preferably 5% by mass or more, more preferably 10% by mass or more, still more preferably 30% by mass or more, particularly preferably 50% by mass or more. When the amount is less than 5% by mass, excellent fuel economy and excellent rubber strength may not be obtained. The upper limit of the amount is not particularly limited and is preferably 90% by mass or less, more preferably 80% by mass or less.

Non-limiting examples of the SBR include emulsion-polymerized styrene-butadiene rubber (E-SBR), solution-polymerized styrene-butadiene rubber (S-SBR), and modified SBRs prepared therefrom. Among these, E-SBR is preferred because its use allows for good dispersion of carbon black or cellulose fibers and provides good processability.

Examples of the modified SBR include SBR whose chain end and/or backbone have been modified, and modified SBRs (e.g. condensates or those having a branched structure) coupled with tin, silicon compounds, or the like.

The SBR preferably has a styrene content of 5% by mass or more, more preferably 10% by mass or more, still more preferably 20% by mass or more. When the styrene content is less than 5% by mass, sufficient grip performance or rubber strength may not be obtained. The styrene content is also preferably 60% by mass or less, more preferably 50% by mass or less, still more preferably 30% by mass or less. When the styrene content is more than 60% by mass, excellent fuel economy may not be obtained.

Herein, the styrene content in the SBR is determined by $^1$H-NMR.

The SBR preferably has a vinyl content of 10% by mass or more, more preferably 15% by mass or more. When the vinyl content is less than 10% by mass, sufficient hardness, grip performance, or rubber strength may not be obtained. The vinyl content is preferably 65% by mass or less, more preferably 60% by mass or less, still more preferably 30% by mass or less, particularly preferably 25% by mass or less. When the vinyl content is more than 65% by mass, grip performance, durability, or abrasion resistance may be deteriorated.

Herein, the vinyl content (1,2-butadiene unit) in the SBR can be determined by infrared absorption spectrometry or $^1$H-NMR.

The SBR preferably has a Mooney viscosity ($ML_{1+4}$ (100° C.)) of 35 or more, more preferably 45 or more, still more preferably 50 or more. When the Mooney viscosity is less than 35, the unvulcanized rubber composition may have so low a viscosity that a proper thickness cannot be ensured after vulcanization. The Mooney viscosity is preferably 65 or less, more preferably 60 or less. When the Mooney viscosity is more than 65, the unvulcanized rubber composition may become so hard that it may be difficult to extrude with smooth edges.

Herein, the Mooney viscosity of the SBR is measured in accordance with ISO 289 or JIS K 6300.

The amount of SBR based on 100% by mass of the rubber component (C) is preferably 5% by mass or more, more preferably 10% by mass or more, still more preferably 15% by mass or more, while it is preferably 95% by mass or less, more preferably 60% by mass or less, still more preferably 55% by mass or less, particularly preferably 50% by mass or less. When the amount of SBR falls within the above range, good fuel economy and good processability can be obtained.

The combined amount of natural rubber and SBR based on 100% by mass of the rubber component (C) is preferably 80% by mass or more, more preferably 100% by mass. When the combined amount falls within the above range, excellent fuel economy, excellent processability, and cost advantages can be obtained.

When a bead apex is formed from the modified cellulose fiber-containing rubber composition according to the fifth aspect of the invention, the modified cellulose fiber (A) and the dispersing polymer (B) used may be as described above and can be used in amounts as specified above.

When a bead apex is formed from the modified cellulose fiber-containing rubber composition according to the fifth aspect of the invention, non-limiting examples of usable carbon black include GPF, FEF, HAF, ISAF, and SAF. The above carbon black may be used alone or in combinations of two or more types.

The carbon black preferably has a nitrogen adsorption specific surface area ($N_2SA$) of 10 $m^2/g$ or more, more preferably 30 $m^2/g$ or more, still more preferably 50 $m^2/g$ or more, while the $N_2SA$ is preferably 250 $m^2/g$ or less, more preferably 150 $m^2/g$ or less, still more preferably 100 $m^2/g$ or less. When the $N_2SA$ is less than 10 $m^2/g$, sufficient adhesion or rubber strength may not be obtained. When the $N_2SA$ is more than 250 $m^2/g$, the unvulcanized rubber composition tends to have a very high viscosity, thereby deteriorating processability. In addition, fuel economy also tends to be deteriorated.

The amount of carbon black relative to 100 parts by mass of the rubber component (C) is preferably 5 parts by mass or more, more preferably 20 parts by mass or more, still more preferably 40 parts by mass or more, while it is preferably 100 parts by mass or less, more preferably 80 parts by mass or less, still more preferably 70 parts by mass or less. When the amount is less than 5 parts by mass, sufficient adhesion or rubber strength may not be obtained. When the amount exceeds 100 parts by mass, dispersibility or processability tends to be deteriorated.

When a bead apex is formed from the modified cellulose fiber-containing rubber composition according to the fifth aspect of the invention, the rubber composition may contain a white filler. Examples of the white filler include those commonly used in the rubber industry, for example, silica, calcium carbonate, mica such as sericite, aluminum hydroxide, magnesium oxide, magnesium hydroxide, clay, talc, alumina, and titanium oxide.

The amount of white filler (in particular, silica) relative to 100 parts by mass of the rubber component (C) is preferably 10 parts by mass or more, more preferably 20 parts by mass or more, while it is preferably 120 parts by mass or less, more preferably 100 parts by mass or less.

When a bead apex is formed from the modified cellulose fiber-containing rubber composition according to the fifth aspect of the invention, the modified cellulose fiber-containing rubber composition preferably contains zinc oxide. The addition of zinc oxide is effective in preventing reversion and accelerating vulcanization.

The amount of zinc oxide relative to 100 parts by mass of the rubber component (C) is preferably 2 parts by mass or more, more preferably 3 parts by mass or more, while it is preferably 15 parts by mass or less, more preferably 10 parts by mass or less. When the amount is less than 2 parts by mass, the zinc oxide may be less effective as a vulcanization accelerator. When the amount exceeds 15 parts by mass, rubber strength may be reduced.

When a bead apex is formed from the modified cellulose fiber-containing rubber composition according to the fifth aspect of the invention, the modified cellulose fiber-containing rubber composition may appropriately contain various materials commonly used in the tire industry, in addition to the above materials. Examples include silane coupling agents, resins, plasticizers such as oil, stearic acid, various age resisters, vulcanizing agents such as sulfur, and vulcanization accelerators.

Examples of the resin include phenol-based resins and cresol-based resins, with phenol-based resins being preferred among these. Examples of phenol-based resins include phenol resins obtained by reacting phenols with aldehydes such as formaldehyde, acetaldehyde, or furfural, and modified phenol resins obtained by modification with cashew oil, tall oil, linseed oil, various animal and vegetable oils, unsaturated fatty acids, rosin, alkylbenzene resins, aniline, melamine, or the like. Among these, modified phenol resins are preferred, and cashew oil-modified phenol resin is particularly preferred, because they improve hardness.

When a resin is added, the amount of the resin relative to 100 parts by mass of the rubber component (C) is preferably 1 part by mass or more, more preferably 5 parts by mass or more in order to provide sufficient hardness. For excellent processability, the amount of the resin is preferably 30 parts by mass or less, more preferably 20 parts by mass or less.

<Clinch Apex>

When a clinch apex is formed from the modified cellulose fiber-containing rubber composition according to the fifth aspect of the invention, the rubber component (C) used may be as described above. In view of abrasion resistance and fuel economy, the rubber component (C) preferably includes both natural rubber and polybutadiene rubber (BR).

The amount of natural rubber based on 100% by mass of the rubber component (C) is preferably 5% by mass or more, more preferably 10% by mass or more, still more preferably 30% by mass or more. When the amount is less than 5% by mass, excellent fuel economy and excellent rubber strength may not be obtained. The upper limit of the amount is not particularly limited and is preferably 90% by mass or less, more preferably 70% by mass or less.

The BR used may be as described in the first aspect of the invention.

The Mooney viscosity ($ML_{1+4}$ (100° C.)) of the BR is as described in the first aspect of the invention.

The amount of BR based on 100% by mass of the rubber component (C) is preferably 5% by mass or more, more preferably 10% by mass or more, still more preferably 30% by mass or more, while it is preferably 80% by mass or less, more preferably 70% by mass or less, still more preferably 60% by mass or less. When the amount is less than 5% by mass, abrasion resistance may be deteriorated. When the amount exceeds 80% by mass, processability tends to be deteriorated.

The combined amount of natural rubber and BR based on 100% by mass of the rubber component (C) is preferably 80% by mass or more, more preferably 100% by mass. When the combined amount falls within the above range, excellent fuel economy and excellent processability can be obtained.

When a clinch apex is formed from the modified cellulose fiber-containing rubber composition according to the fifth aspect of the invention, the modified cellulose fiber (A) and the dispersing polymer (B) used may be as described above and can be used in amounts as specified above.

When a clinch apex is formed from the modified cellulose fiber-containing rubber composition according to the fifth aspect of the invention, examples of usable carbon black include those described when a bead apex is formed from the modified cellulose fiber-containing rubber composition according to the fifth aspect of the invention.

The amount of carbon black relative to 100 parts by mass of the rubber component (C) is preferably 5 parts by mass or more, more preferably 20 parts by mass or more, still more preferably 40 parts by mass or more, while it is preferably 100 parts by mass or less, more preferably 80 parts by mass or less, still more preferably 70 parts by mass or less. When the amount is less than 5 parts by mass, sufficient abrasion resistance, adhesion, or rubber strength may not be obtained. When the amount exceeds 100 parts by mass, dispersibility or processability tends to be deteriorated.

When a clinch apex is formed from the modified cellulose fiber-containing rubber composition according to the fifth aspect of the invention, the modified cellulose fiber-containing rubber composition may contain a white filler. Examples of the white filler include those described when a bead apex is formed from the modified cellulose fiber-containing rubber composition according to the fifth aspect of the invention. Also, the white filler is used in an amount as specified when a bead apex is formed from the modified cellulose fiber-containing rubber composition according to the fifth aspect of the invention.

When a clinch apex is formed from the modified cellulose fiber-containing rubber composition according to the fifth aspect of the invention, the modified cellulose fiber-containing rubber composition may appropriately contain various materials commonly used in the tire industry, in addition to the above materials. Examples include silane coupling agents, plasticizers such as oil or wax, zinc oxide, stearic acid, various age resisters, vulcanizing agents such as sulfur, and vulcanization accelerators.

<Ply Topping>

When a ply topping is formed from the modified cellulose fiber-containing rubber composition according to the fifth aspect of the invention, the rubber component (C) used may be as described above. The rubber component (C) preferably includes both natural rubber and styrene-butadiene rubber (SBR).

The amount of natural rubber based on 100% by mass of the rubber component (C) is preferably 5% by mass or more, more preferably 10% by mass or more, still more preferably 20% by mass or more, particularly preferably 50% by mass or more. When the amount is less than 5% by mass, excellent fuel economy and excellent rubber strength may not be obtained. The upper limit of the amount is not particularly limited and is preferably 90% by mass or less, more preferably 80% by mass or less.

Examples of the SBR include those described when a bead apex is formed from the modified cellulose fiber-containing rubber composition according to the fifth aspect of the invention.

The amount of SBR based on 100% by mass of the rubber component (C) is preferably 5% by mass or more, more preferably 10% by mass or more. When the amount is less than 5% by mass, reversion resistance may be reduced. The amount of SBR is preferably 60% by mass or less, more preferably 50% by mass or less. When the amount exceeds 60% by mass, the amount of natural rubber decreases, so that fuel economy may be deteriorated.

When a ply topping is formed from the modified cellulose fiber-containing rubber composition according to the fifth aspect of the invention, the modified cellulose fiber (A) and the dispersing polymer (B) used may be as described above and can be used in amounts as specified above.

When a ply topping is formed from the modified cellulose fiber-containing rubber composition according to the fifth aspect of the invention, examples of usable carbon black include those described in the first aspect of the invention.

The amount of carbon black relative to 100 parts by mass of the rubber component (C) is preferably 10 parts by mass or more, more preferably 15 parts by mass or more, while it is preferably 100 parts by mass or less, more preferably 80 parts by mass or less, still more preferably 70 parts by mass or less. When the amount is less than 10 parts by mass, sufficient reinforcing properties tend not to be obtained. When the amount exceeds 100 parts by mass, heat build-up increases so that fuel economy tends to be deteriorated.

When a ply topping is formed from the modified cellulose fiber-containing rubber composition according to the fifth aspect of the invention, the modified cellulose fiber-containing rubber composition may contain a white filler. Examples of the white filler include those described when a bead apex is formed from the modified cellulose fiber-containing rubber composition according to the fifth aspect of the invention. Also, the white filler is used in an amount as specified when a bead apex is formed from the modified cellulose fiber-containing rubber composition according to the fifth aspect of the invention.

When a ply topping is formed from the modified cellulose fiber-containing rubber composition according to the fifth aspect of the invention, the modified cellulose fiber-containing rubber composition preferably contains zinc oxide. The addition of zinc oxide improves adhesion between cords and the rubber. Zinc oxide also functions as a vulcanization activator for rubber. Furthermore, zinc oxide is effective for preventing scorch.

The amount of zinc oxide relative to 100 parts by mass of the rubber component (C) is preferably 2 parts by mass or more, more preferably 3 parts by mass or more, still more preferably 4 parts by mass or more. An amount of less than 2 parts by mass may result in insufficient adhesion between the plated layer of steel cords and the rubber, or insufficient vulcanization of the rubber. The amount of zinc oxide is also preferably 25 parts by mass or less, more preferably 20 parts by mass or less, still more preferably 15 parts by mass or less. An amount of more than 25 parts by mass may reduce rubber strength.

When a ply topping is formed from the modified cellulose fiber-containing rubber composition according to the fifth aspect of the invention, the modified cellulose fiber-containing rubber composition preferably contains sulfur as a vulcanizing agent. The same sulfurs as described in the first aspect of the invention can be used.

The amount of sulfur relative to 100 parts by mass of the rubber component (C) is preferably 2 parts by mass or more, more preferably 3 parts by mass or more. When the amount is less than 2 parts by mass, sufficient crosslink density may not be achieved and adhesion performance may be deteriorated. Also, the amount is preferably 10 parts by mass or less, more preferably 8 parts by mass or less, still more preferably 6 parts by mass or less. When the amount exceeds 10 parts by mass, thermal aging resistance may be deteriorated.

When a ply topping is formed from the modified cellulose fiber-containing rubber composition according to the fifth aspect of the invention, the modified cellulose fiber-containing rubber composition may appropriately contain various materials commonly used in the tire industry, in addition to the above materials. Examples include silane coupling agents, plasticizers such as oil, stearic acid, various age resisters, and vulcanization accelerators.

The same vulcanization accelerators as described in the third aspect of the invention can be used.

The same oils as described in the third aspect of the invention can be used in an amount as specified in the third aspect of the invention.

<Tread>

When a tread is formed from the modified cellulose fiber-containing rubber composition according to the fifth aspect of the invention, the rubber component (C) used may be as described above. The rubber component (C) preferably includes both natural rubber and styrene-butadiene rubber (SBR).

The amount of natural rubber based on 100% by mass of the rubber component (C) is preferably 5% by mass or more, more preferably 10% by mass or more, still more preferably 20% by mass or more. When the amount is less than 5% by mass, excellent fuel economy may not be obtained. Also, the amount is preferably 80% by mass or less, more preferably 60% by mass or less, still more preferably 40% by mass or less. When the amount exceeds 80% by mass, wet-grip performance may be reduced.

Examples of the SBR include those described when a bead apex is formed from the modified cellulose fiber-containing rubber composition according to the fifth aspect of the invention.

The amount of SBR based on 100% by mass of the rubber component (C) is preferably 40% by mass or more, more preferably 50% by mass or more. When the amount is less than 40% by mass, sufficient grip performance may not be obtained. The amount of SBR is preferably 90% by mass or less, more preferably 80% by mass or less. When the amount exceeds 90% by mass, the amount of natural rubber decreases, so that fuel economy may be deteriorated.

When a tread is formed from the modified cellulose fiber-containing rubber composition according to the fifth aspect of the invention, the modified cellulose fiber (A) and the dispersing polymer (B) used may be as described above and can be used in amounts as specified above.

When a tread is formed from the modified cellulose fiber-containing rubber composition according to the fifth aspect of the invention, examples of usable carbon black include those described in the first aspect of the invention.

The amount of carbon black relative to 100 parts by mass of the rubber component (C) is preferably 1 part by mass or more, more preferably 2 parts by mass or more, while it is preferably 150 parts by mass or less, more preferably 100 parts by mass or less, still more preferably 50 parts by mass or less, particularly preferably 30 parts by mass or less. When the amount falls within the above range, good fuel economy, good abrasion resistance, and good wet-grip performance can be obtained.

When a tread is formed from the modified cellulose fiber-containing rubber composition according to the fifth aspect of the invention, the modified cellulose fiber-containing rubber composition preferably contains a white filler. Examples of the white filler include those described when a bead apex is formed from the modified cellulose fiber-containing rubber composition according to the fifth aspect of the invention. In view of fuel economy, silica is preferred among these.

Non-limiting examples of the silica include dry silica (anhydrous silicic acid) and wet silica (hydrous silicic acid). Preferred is wet silica as it has many silanol groups.

The silica preferably has a nitrogen adsorption specific surface area ($N_2SA$) of 40 $m^2/g$ or more, more preferably 50 $m^2/g$ or more, still more preferably 100 $m^2/g$ or more, particularly preferably 150 $m^2/g$ or more. When the $N_2SA$ is less than 40 $m^2/g$, tensile strength after vulcanization tends to be reduced. The silica also preferably has an $N_2SA$ of 500 $m^2/g$ or less, more preferably 300 $m^2/g$ or less, still more preferably 200 $m^2/g$ or less. When the $N_2SA$ is more than 500 $m^2/g$, low heat build-up properties or rubber processability tends to be reduced.

The amount of white filler (in particular, silica) relative to 100 parts by mass of the rubber component (C) is preferably 5 parts by mass or more, more preferably 20 parts by mass or more, still more preferably 30 parts by mass or more, particularly preferably 40 parts by mass or more. When the amount is less than 5 parts by mass, low heat build-up properties may be insufficient. Also, the amount is preferably 200 parts by mass or less, more preferably 150 parts by mass or less, still more preferably 130 parts by mass or less. When the amount exceeds 200 parts by mass, it is difficult to disperse the filler into rubber and rubber processability tends to be deteriorated.

When a tread is formed from the modified cellulose fiber-containing rubber composition according to the fifth aspect of the invention which contains silica, the rubber composition preferably further contains a silane coupling agent. The same silane coupling agents as described in the first aspect of the invention can be used in an amount as specified in the first aspect of the invention.

When a tread is formed from the modified cellulose fiber-containing rubber composition according to the fifth aspect of the invention, in the modified cellulose fiber-containing rubber composition, the combined amount of white filler and carbon black, relative to 100 parts by mass of the rubber component (C), is preferably 5 parts by mass or more, more preferably 10 parts by mass or more, still more preferably 20 parts by mass or more. The combined amount is preferably 150 parts by mass or less, more preferably 120 parts by mass or less. When the combined amount falls within the above range, good fuel economy, good abrasion resistance, and good wet-grip performance can be obtained.

When a tread is formed from the modified cellulose fiber-containing rubber composition according to the fifth aspect of the invention, the modified cellulose fiber-containing rubber composition preferably contains oil as a plasticizer. The addition of oil can adjust hardness so as to be appropriately low, thereby resulting in good processability. Examples of the oil include those described in the first aspect of the invention.

The amount of oil relative to 100 parts by mass of the rubber component (C) is preferably 1 part by mass or more, more preferably 2 parts by mass or more, while it is preferably 30 parts by mass or less, more preferably 20 parts by mass or less. When the amount falls within the above range, good processability can be imparted and, further, excellent fuel economy and excellent wet-grip performance can be obtained.

When a tread is formed from the modified cellulose fiber-containing rubber composition according to the fifth aspect of the invention, the modified cellulose fiber-containing rubber composition may appropriately contain various materials commonly used in the tire industry, in addition to the above materials. Examples include zinc oxide, stearic acid, various age resisters, plasticizers excluding oil, e.g. wax, vulcanizing agents, e.g. sulfur or organic peroxides, and vulcanization accelerators, e.g. sulfenamide or guanidine vulcanization accelerators.

<Lining Strip Layer of Run-Flat Tire>

According to the sixth aspect of the invention in which a lining strip layer of a run-flat tire is formed from the modified cellulose fiber-containing rubber composition, the rubber component (C) preferably includes both natural rubber and polybutadiene rubber (BR) because these rubbers provide good durability.

The amount of natural rubber based on 100% by mass of the rubber component (C) is preferably 5% by mass or more, more preferably 10% by mass or more, still more preferably 20% by mass or more. When the amount is less than 5% by mass, excellent fuel economy may not be obtained. Also, the amount is preferably 90% by mass or less, more preferably 70% by mass or less, still more preferably 50% by mass or less, particularly preferably 30% by mass or less. When the amount exceeds 90% by mass, tensile strength may be reduced.

The BR may be as described in the first aspect of the invention.

The Mooney viscosity ($ML_{1+4}$ (100° C.)) of the BR is as described in the first aspect of the invention.

In general, lining strip layers of run-flat tires contain polybutadiene rubber containing syndiotactic polybutadiene crystals (SPB-containing BR), such as VCR412 or VCR617 to ensure hardness. However, too large an amount of SPB-containing BR may cause deterioration of fuel economy. In contrast, according to the sixth aspect of the invention, the use of the modified cellulose fiber makes it possible to ensure hardness without the use of SPB-containing BR, thereby suppressing deterioration of fuel economy. Thus, in the sixth aspect of the invention, SPB-containing BR may not be used but can be used to the extent that it does not deteriorate fuel economy. Specifically, when SPB-containing BR is used, the amount of SPB-containing BR based on 100% by mass of the rubber component (C) is preferably 8% by mass or less, more preferably 5% by mass or less, still more preferably 3% by mass or less.

When SPB-containing BR is used, the SPB-containing BR may be one commonly used in tire production. In view of achieving the above-mentioned properties well, the SPB-containing BR is preferably such that 1,2-syndiotactic polybutadiene crystals are chemically bonded to and dispersed in the butadiene matrix.

The melting point of 1,2-syndiotactic polybutadiene crystals in the SPB-containing BR is preferably 180° C. or higher, more preferably 190° C. or higher, while it is preferably 220° C. or lower, more preferably 210° C. or lower. SPB-containing BR with a melting point of lower than 180° C. may not sufficiently exert the effect of improving handling stability. When the melting point is higher than 220° C., processability tends to be deteriorated.

The 1,2-syndiotactic polybutadiene crystal content (the amount of boiling n-hexane insolubles) in the SPB-containing BR is preferably 2.5% by mass or more, more preferably 10% by mass or more. When the content is less than 2.5% by mass, a sufficient reinforcing effect (E*) may not be obtained. The 1,2-syndiotactic polybutadiene crystal content is preferably 20% by mass or less, more preferably 18% by mass or less. When the content exceeds 20% by mass, processability tends to be deteriorated.

The amount of BR (when two or more types of BRs are contained, the total amount of these BRs) based on 100% by mass of the rubber component (C) is preferably 30% by mass or more, more preferably 40% by mass or more, still more preferably 50% by mass or more, particularly preferably 70% by mass or more, while it is preferably 90% by mass or less, more preferably 80% by mass or less. When the amount is less than 30% by mass, sufficient tensile strength and sufficient run-flat durability may not be obtained. When the amount exceeds 90% by mass, fuel economy and processability may be reduced.

The modified cellulose fiber (A) and the dispersing polymer (B) in the modified cellulose fiber-containing rubber composition in the sixth aspect of the invention may be as described above and can be used in amounts as specified above.

Examples of carbon black that may be contained in the modified cellulose fiber-containing rubber composition in the sixth aspect of the invention include those described in the first aspect of the invention.

The amount of carbon black relative to 100 parts by mass of the rubber component (C) is preferably 5 parts by mass or more, more preferably 10 parts by mass or more, while it is preferably 150 parts by mass or less, more preferably 100 parts by mass or less, still more preferably 80 parts by mass or less. When the amount is less than 5 parts by mass, a sufficient reinforcing effect may not be obtained. When the amount exceeds 150 parts by mass, dispersibility or processability tends to be deteriorated.

The modified cellulose fiber-containing rubber composition in the sixth aspect of the invention may contain a white filler. Examples of the white filler include those described in the first aspect of the invention.

The white filler (in particular, silica) can be used in an amount as specified in the second aspect of the invention.

In the case of the modified cellulose fiber-containing rubber composition in the sixth aspect of the invention which contains silica, the rubber composition preferably further contains a silane coupling agent. The silane coupling agent may be as described in the first aspect of the invention and can be used in an amount as specified in the first aspect of the invention.

The modified cellulose fiber-containing rubber composition in the sixth aspect of the invention preferably contains oil as a plasticizer. The addition of oil can adjust hardness so as to be appropriately low, thereby resulting in good processability. The same oils as described in the first aspect of the invention can be used.

The oil can be used in an amount as specified in the second aspect of the invention.

Examples of age resisters that may be contained in the modified cellulose fiber-containing rubber composition in the sixth aspect of the invention include those described in the first aspect of the invention.

Examples of vulcanization accelerators that may be contained in the modified cellulose fiber-containing rubber composition in the sixth aspect of the invention include those described in the first aspect of the invention, which can be used in an amount as specified in the first aspect of the invention.

The modified cellulose fiber-containing rubber composition in the sixth aspect of the invention preferably contains zinc oxide. The addition of zinc oxide is effective in preventing reversion and accelerating vulcanization.

The amount of zinc oxide relative to 100 parts by mass of the rubber component (C) is preferably 2 parts by mass or more, more preferably 3 parts by mass or more, while it is preferably 15 parts by mass or less, more preferably 10 parts by mass or less. When the amount is less than 2 parts by mass, the zinc oxide may be less effective as a vulcanization accelerator. When the amount exceeds 15 parts by mass, rubber strength may be reduced.

The modified cellulose fiber-containing rubber composition in the sixth aspect of the invention may suitably contain sulfur as a vulcanizing agent. The same sulfurs as described in the first aspect of the invention can be used.

The amount of sulfur relative to 100 parts by mass of the rubber component (C) is preferably 1 part by mass or more, more preferably 1.5 parts by mass or more. When the amount is less than 1 part by mass, the effect of sulfur may be low. Also, the amount is preferably 10 parts by mass or less, more preferably 8 parts by mass or less. When the amount exceeds 10 parts by mass, the effect of suppressing hardening deterioration may be insufficient.

The pneumatic tire according to the first aspect of the invention can be produced from the modified cellulose fiber-containing rubber composition in the first aspect of the invention by conventional methods. Specifically, the tire can be produced as follows: the modified cellulose fiber-containing rubber composition in the first aspect of the invention, before vulcanization, is extruded into the shape of a sidewall, and formed and assembled with other tire components on a tire building machine in a usual manner to build an unvulcanized tire, which is then heated and pressurized in a vulcanizer.

The pneumatic tire according to the second aspect of the invention can be produced from the modified cellulose fiber-containing rubber composition in the second aspect of the invention by conventional methods. Specifically, the tire can be produced as follows: the modified cellulose fiber-containing rubber composition in the second aspect of the invention, before vulcanization, is extruded into the shape of a base tread, and formed and assembled with other tire components on a tire building machine in a usual manner to build an unvulcanized tire, which is then heated and pressurized in a vulcanizer.

The pneumatic tire according to the third aspect of the invention can be produced from the modified cellulose fiber-containing rubber composition in the third aspect of the invention by conventional methods. Specifically, the pneumatic tire can be produced as follows: steel cords are coated with the modified cellulose fiber-containing rubber composition in the third aspect of the invention, formed into the shape of a breaker, and then assembled with other tire components to build an unvulcanized tire followed by vulcanization.

The pneumatic tire according to the fourth aspect of the invention can be produced from the modified cellulose fiber-containing rubber composition in the fourth aspect of the invention by conventional methods. Specifically, the pneumatic tire can be produced as follows: the modified cellulose fiber-containing rubber composition in the fourth aspect of the invention, before vulcanization, is extruded into the shape of an innerliner, and formed and assembled with other tire components on a tire building machine in a usual manner to build an unvulcanized tire, which is then heated and pressurized in a vulcanizer.

Regarding the fifth aspect of the invention, the pneumatic tire which includes the above-mentioned tire component (s), excluding ply topping, each formed from the modified cellulose fiber-containing rubber composition in the fifth aspect of the invention can be produced from the modified cellulose fiber-containing rubber composition in the fifth aspect of the invention by conventional methods. Specifically, the tire can be produced as follows: the modified cellulose fiber-containing rubber composition which contains various additives as needed, before vulcanization, is extruded into the shape of each tire component, and formed and assembled with other tire components on a tire building machine in a usual manner to build an unvulcanized tire, which is then heated and pressurized in a vulcanizer.

Regarding the fifth aspect of the invention, the pneumatic tire which includes a ply topping formed from the modified cellulose fiber-containing rubber composition in the fifth aspect of the invention can be produced from the modified cellulose fiber-containing rubber composition in the fifth aspect of the invention by conventional methods. Specifically, the tire can be produced as follows: the rubber composition was kneaded in a usual manner to prepare an unvulcanized rubber composition, which is then press-bonded to cords to form an unvulcanized ply strip (rubberized cords); and the ply strip is assembled with other tire components on a tire building machine in a usual manner to build an unvulcanized tire, which is then heated and pressurized in a vulcanizer.

The run-flat tire according to the sixth aspect of the invention can be produced from the modified cellulose fiber-containing rubber composition in the sixth aspect of the invention by conventional methods. Specifically, the run-flat tire can be produced as follows: the modified cellulose fiber-containing rubber composition in the sixth aspect of the invention, before vulcanization, is extruded into the shape of a lining strip layer, and formed and assembled with other tire components on a tire building machine in a usual manner to build an unvulcanized tire, which is then heated and pressurized in a vulcanizer.

The pneumatic tires according to the first to the fifth aspects of the invention and the run-flat tire according to the sixth aspect of the invention can be suitably used as tires for passenger vehicles, trucks and buses, two-wheeled vehicles, racing vehicles, or the like, and especially as tires for passenger vehicles.

EXAMPLES

The present invention is specifically described with reference to examples but is not limited thereto.

Measurements of physical properties performed in some of the examples are described below.

(1) Monitoring of Progress of Modification Reaction

The progress of modification reactions was observed using a Fourier transform infrared spectrometer "Spectrum one" available from Perkin Elmer. Specifically, the intensity of the peak associated with the stretching vibration of the carbonyl carbon and oxygen in the ester bond between 1,650 to 1,750 $cm^{-1}$, which increases along with the progress of the modification reaction, was qualitatively monitored.

(2) Measurement of Ratio of Acid Anhydride Added to Cellulose Fiber

The addition ratio was calculated from the change in the mass of the cellulose fiber before and after modification according to the equation (I) below. The sample to be evaluated for addition ratio was washed with a sufficient amount of a solvent before the measurement. A good solvent for the acid anhydride was appropriately selected as the solvent for washing.

$$Wp=(W-Ws)\times 100/Ws \quad (I)$$

Wp: Ratio (% by mass) of acid anhydride added to cellulose fiber
W: Dry mass (g) of cellulose fiber after modification (modified cellulose fiber)
Ws: Dry mass (g) of cellulose fiber before modification (3) Measurement of Solid Content The solid content was measured with an infrared moisture balance ("FD-620" available from Kett Electric Laboratory).

(4) Measurement of Acid Value

The acid value of the acid anhydride was measured by the following procedure.

An amount of 0.5 g of the acid anhydride was weighed and dissolved in 50 mL of tetrahydrofuran. To the solution was added ten drops of a 1% solution of phenolphthalein in ethanol to give an acid anhydride solution. A 0.5 N solution of potassium hydroxide in ethanol was dropwise added to the acid anhydride solution with stirring to color the system. A point at which the color no longer changed for 3.0 seconds without dropping the potassium hydroxide solution was taken as the end point. The acid value (mg KOH/g) was calculated from the mass of the potassium hydroxide solution added until the end point according to the following equation (II).

$$\text{Acid value}=Wk\times 56.1 \quad (II)$$

Wk: Mass (g) of 0.5 N potassium hydroxide solution added until end point

[Preparation of Modified Cellulose Fiber (A-1)]

An amount of 250.00 g (solids: 50.00 g) of a water-wet needle bleached kraft pulp (hereinafter, referred to as NBKP) and 200.00 g of N-methylpyrrolidone were charged into a 2,000-mL vessel, and the water was evaporated off to give a solvent-replaced NBKP. The temperature inside the system was adjusted to 70° C., and 39.75 g of hexadecenyl succinic anhydride as an acid anhydride (a) and 8.53 g of potassium carbonate as a catalyst for esterification were introduced into the system and reacted for 2 hours. The reaction product was washed sequentially with ethanol, acetic acid, and water, followed by replacing the solvent with ethanol. The resulting product was dried to give a modified cellulose fiber A-1. Ethanol was used as a solvent for washing the sample to be evaluated for addition ratio. The ratio of the acid anhydride (a) added to the cellulose fiber in the modified cellulose fiber A-1 was 59.6% by mass.

[Synthesis of Acid Anhydride Group-Containing Petroleum Resin (a-1)]

An amount of 1,200.00 g of Petrotack 70 (available from Tosoh Corporation, C5/C9 petroleum resin, weight average molecular weight: 1,300, softening point: 70° C., bromine value: 45 $Br_2$ g/100 g) was introduced into a 3,000-mL separable flask, and heated to 160° C. so that it was molten. While the temperature inside the system was maintained at 160° C., the system was purged with nitrogen, and then 221.00 g of maleic anhydride and 6.00 g of t-butyl peroxide were introduced in twelve aliquots over 3 hours. Two hours after the completion of the introduction, the temperature inside the system was adjusted to 180° C. and the system was maintained under reduced pressure for 2 hours to evaporate off unreacted maleic anhydride. As a result of this purification procedure, an acid anhydride group-containing petroleum resin a-1 having an acid value of 98, a softening point of 96° C., and a weight average molecular weight of 5,800 was obtained.

[Preparation of Modified Cellulose Fiber (A-2)]

An amount of 250.00 g (solids: 50.00 g) of a water-wet NBKP and 200.00 g of N-methylpyrrolidone were charged into a 2,000-mL vessel, and the water was evaporated off to give a solvent-replaced NBKP. The temperature inside the system was adjusted to 75° C., and 50.00 g of the acid anhydride group-containing petroleum resin a-1 was weighed and introduced as an acid anhydride (a) together with 8.53 g of potassium carbonate as a catalyst for esterification and they were reacted for 3 hours. The reaction product was washed sequentially with acetic acid, water, and ethanol, followed by drying to give a modified cellulose fiber A-2. Tetrahydrofuran was used as a solvent for washing the sample to be evaluated for addition ratio. The ratio of the acid anhydride group-containing petroleum resin a-1 added to the cellulose fiber in the modified cellulose fiber A-2 was 36% by mass.

[Preparation of Modified Cellulose Fiber-Containing Resin Composition]

Preparation Example 1

Quintone R100 (available from Zeon Corporation, C5 petroleum resin, weight average molecular weight: 2,250, softening point: 96° C.) as a dispersing polymer (B), the modified cellulose fiber A-1, stearic acid (stearic acid beads "Tsubaki" available from NOF Corporation) as a lubricant, and AO-60 (available from Adeka Corporation, phenolic antioxidant) as an antioxidant were used and introduced into a twin-screw kneader ("KZW" available from Technovel Corporation, screw diameter: 15 mm, L/D: 45) according to the proportions shown in Table 1 below, followed by melt-kneading to give a modified cellulose fiber-containing resin composition X-1.

Preparation Example 2

A modified cellulose fiber-containing resin composition X-2 was prepared in the same manner as in Preparation Example 1, except that Petcoal LX (available from Tosoh Corporation, C9 petroleum resin, weight average molecular weight: 1,400, softening point: 98° C.) was used as a dispersing polymer (B).

Preparation Example 3

Petcoal LX (available from Tosoh Corporation, C9 petroleum resin, weight average molecular weight: 1,400, softening point: 98° C.) and the acid anhydride group-containing petroleum resin a-1 (acid value: 98, softening point: 96° C., weight average molecular weight: 5,800) as dispersing polymers (B), the modified cellulose fiber A-2, stearic acid (stearic acid beads "Tsubaki" available from NOF Corporation) as a lubricant, and AO-60 (available from Adeka Corporation, phenolic antioxidant) as an antioxidant were used and introduced into a twin-screw kneader ("KZW" available from Technovel Corporation, screw diameter: 15 mm, L/D: 45) according to the proportions shown in Table 1 below, followed by melt-kneading to give a modified cellulose fiber-containing resin composition X-3.

Preparation Example 4

A modified cellulose fiber-containing resin composition X-4 was prepared in the same manner as in Preparation Example 1, except that the materials were compounded according to the proportions shown in Table 1 below without using any dispersing polymer (B).

Preparation Example 5

A resin composition consisting only of Quintone R100 was used as a resin composition X-5.

Preparation Example 6

A resin composition consisting only of Petcoal LX was used as a resin composition X-6.

The Table 1 below shows the formulations of the resin compositions X-1 to X-6.

Quintone R100: C5 petroleum resin, weight average molecular weight: 2250, softening point: 96° C., available from Zeon Corporation Petcoal LX: C9 petroleum resin, weight average molecular weight: 1,400, softening point: 98° C., available from Tosoh Corporation Stearic acid: Stearic acid beads "Tsubaki" available from NOF Corporation AO-60: Phenolic antioxidant available from Adeka Corporation Examples and comparative examples are shown below for each tire component.

<Sidewall>

Various chemicals used in examples and comparative examples are listed below.

X-1 to X-6: Resin compositions X-1 to X-6 prepared in Preparation Examples 1 to 6

Natural rubber: TSR20

Polybutadiene rubber: BR150B (cis content: 97% by mass, $ML_{1+4}$ (100° C.): 40) available from Ube Industries, Ltd.

Carbon black: Shoblack N550 ($N_2SA$: 42 $m^2$/g) available from Cabot Japan K. K.

Age resister: Nocrac 6C (N-phenyl-N'-(1,3-dimethylbutyl)-p-phenylenediamine, 6PPD) available from Ouchi Shinko Chemical Industrial Co., Ltd.

Oil: Diana Process AH-24 available from Idemitsu Kosan Co., Ltd.

Zinc oxide: Zinc oxide #2 available from Mitsui Mining and Smelting Co., Ltd.

Stearic acid: Stearic acid beads "Tsubaki" available from NOF Corporation

Sulfur: Seimi Sulfur (oil content: 10%) available from Nippon Kanryu Industry Co., Ltd.

Vulcanization accelerator: NOCCELER NS (N-t-butyl-2-benzothiazole sulfenamide, TBBS) available from Ouchi Shinko Chemical Industrial Co., Ltd.

TABLE 1

| | Modified cellulose fiber (A) | | | | Dispersing polymer (B) | | | Other components | |
|---|---|---|---|---|---|---|---|---|---|
| | Modified cellulose fiber | | | | | | Acid anhydride group- | | |
| | Type | Cellulose content (% by mass) | Modifier component content (% by mass) | | Quintone R100 (% by mass) | Petcoal LX (% by mass) | containing petroleum resin a-1 (% by mass) | Stearic acid (% by mass) | AO-60 (% by mass) |
| X-1 | A-1 | 46.5 | 29.1 | 17.4 | 46.5 | — | — | 6.0 | 1.0 |
| X-2 | A-1 | 46.5 | 29.1 | 17.4 | — | 46.5 | — | 6.0 | 1.0 |
| X-3 | A-2 | 40.8 | 30.0 | 10.8 | — | 43.2 | 9.0 | 6.0 | 1.0 |
| X-4 | A-1 | 93.0 | 58.3 | 34.7 | — | — | — | 6.0 | 1.0 |
| X-5 | — | — | — | — | 100.0 | — | — | — | — |
| X-6 | — | — | — | — | — | 100.0 | — | — | — |

In Table 1, the term "Cellulose content" in the examples using modified cellulose fibers refers to the cellulose fiber content in the modified cellulose fiber and is expressed as an amount (% by mass) based on 100% by mass of the resin composition. The term "Modifier component content" refers to the content of the cyclic polybasic acid anhydride (a) in the modified cellulose fiber and is expressed as an amount (% by mass) based on 100% by mass of the resin composition.

The trade names and codes used in Table 1 are specified below.

Examples 1-1 to 1-5, Comparative Examples 1-1 to 1-5

According to the formulations shown in Table 2, the chemicals other than the sulfur and the vulcanization accelerator were kneaded using a 1.7-L Banbury mixer available from Kobe Steel, Ltd. to give a kneaded mixture. Next, the sulfur and the vulcanization accelerator were added to the kneaded mixture and kneaded together using an open roll mill to give an unvulcanized rubber composition. The unvulcanized rubber composition was press-vulcanized to give a vulcanized rubber composition.

Separately, the unvulcanized rubber composition was formed into the shape of a sidewall and assembled with other tire components on a tire building machine to build an unvulcanized tire, which was then vulcanized to prepare a test tire (size: 195/65R15).

The unvulcanized rubber compositions, vulcanized rubber compositions, and test tires thus prepared were evaluated on the following items. Table 2 shows the results.

(Viscoelasticity Test)

Specimens were cut out of the sidewall of the test tire. The complex elastic modulus $E^*a$ (MPa) in the tire circumferential direction and the complex elastic modulus $E^*b$ (MPa) in the tire radial direction of the specimens were measured at a temperature of 70° C., a frequency of 10 Hz, an initial strain of 10%, and a dynamic strain of 2% using a viscoelasticity spectrometer VES available from Iwamoto Seisakusho Co., Ltd., and expressed as indexes (elastic modulus indexes) using the equation below. A higher elastic modulus index indicates a better elastic modulus, a higher rigidity, and better handling stability.

(Elastic modulus $a$ index)=($E^*a$ of each formulation)/($E^*a$ of Comparative Example 1-1)×100

(Elastic modulus $b$ index)=($E^*b$ of each formulation)/($E^*b$ of Comparative Example 1-1)×100

(Tensile Test)

A tensile test was performed using No. 3 dumbbell specimens prepared from the vulcanized rubber composition in accordance with JIS K 6251 "Rubber, vulcanized or thermoplastics—Determination of tensile stress-strain properties" to measure the elongation at break (tensile elongation, EB (%)) and the tensile strength at break (tensile breaking strength, TB (MPa)) of the vulcanized rubber composition. The values were expressed as an index (tensile strength index) using the equation below. A higher tensile strength index indicates better tensile strength and better durability.

(Tensile strength index)=(EB×TB of each formulation)/(EB×TB of Comparative Example 1-1)×100

(Fuel Economy)

The loss tangent (tan δ) of the vulcanized rubber composition was measured at a temperature of 70° C., a frequency of 10 Hz, an initial strain of 10%, and a dynamic strain of 2% using a viscoelasticity spectrometer VES available from Iwamoto Seisakusho Co., Ltd., and expressed as an index (fuel economy index) using the equation below. A higher fuel economy index indicates a lower rolling resistance and better fuel efficiency performance (fuel economy).

(Fuel economy index)=(tan δ of Comparative Example 1-1)/(tan δ of each formulation)×100

(Tire Performance Balance Index)

A balance index was calculated from the above indexes according to the equation below. A higher index indicates a better balance of handling stability, fuel economy, and durability.

(Balance index)=(Elastic modulus $a$ index)×(Tensile strength index)×(Fuel economy index)/10,000

(Processability: Measurement of Mooney Viscosity)

The Mooney viscosity of the unvulcanized rubber composition was measured at 130° C. by a method of measuring Mooney viscosity in accordance with JIS K 6300, and expressed as an index (Mooney viscosity index) using the equation below. A higher index indicates a lower Mooney viscosity and better processability.

(Mooney viscosity index)=($ML_{1+4}$ of Comparative Example 1-1)/($ML_{1+4}$ of each formulation)×100

(Flex Crack Growth Resistance Test)

Specimens were prepared from the vulcanized rubber sheet (vulcanized rubber composition) and subjected to a flex crack growth test in accordance with JIS K 6260 "Rubber, vulcanized or thermoplastic—Determination of flex cracking and crack growth (De Mattia type)". In the test, the rubber sheet was bent by repeating 70% elongation one million times, and then the length of the formed crack was measured. The reciprocal of the value (length) was expressed as an index, with the reciprocal of the value of Comparative Example 1-1 set equal to 100. A higher index indicates more suppression of crack growth and better flex crack growth resistance.

TABLE 2

| | | Comparative Example 1-1 | Example 1-1 | Example 1-2 | Example 1-3 | Example 1-4 | Example 1-5 | Comparative Example 1-2 | Comparative Example 1-3 | Comparative Example 1-4 | Comparative Example 1-5 |
|---|---|---|---|---|---|---|---|---|---|---|---|
| Formulation (parts by mass) | X-1 | — | 10.75 | — | — | — | — | — | — | — | — |
| | X-2 | — | — | 10.75 | — | — | — | — | — | — | — |
| | X-3 | — | — | — | 12.25 | 24.5 | — | — | — | — | — |
| | X-4 | — | — | — | — | — | 5.38 | 5.38 | — | — | — |
| | X-5 | — | — | — | — | — | — | — | 5 | — | — |
| | X-6 | — | — | — | — | — | 5 | — | — | 5 | — |
| | Natural rubber | 40 | 40 | 40 | 40 | 40 | 40 | 40 | 40 | 40 | 40 |
| | Polybutadiene rubber | 60 | 60 | 60 | 60 | 60 | 60 | 60 | 60 | 60 | 60 |
| | Carbon black | 50 | 50 | 50 | 50 | 50 | 50 | 50 | 50 | 50 | 80 |
| | Oil | 5 | 5 | 5 | 5 | 5 | 5 | 5 | 5 | 5 | 5 |
| | Age resister | 3 | 3 | 3 | 3 | 3 | 3 | 3 | 3 | 3 | 3 |
| | Zinc oxide | 3 | 3 | 3 | 3 | 3 | 3 | 3 | 3 | 3 | 3 |
| | Stearic acid | 2 | 2 | 2 | 2 | 2 | 2 | 2 | 2 | 2 | 2 |
| | Sulfur | 1.5 | 1.5 | 1.5 | 1.5 | 1.5 | 1.5 | 1.5 | 1.5 | 1.5 | 1.5 |
| | Vulcanization accelerator | 1 | 1 | 1 | 1 | 1 | 1 | 1 | 1 | 1 | 1 |
| Amount of modified cellulose fiber (parts by mass) | | — | 5 | 5 | 5 | 10 | 5 | 5 | — | — | — |
| Evaluation | Elastic modulus a in circumferential | 100 | 158 | 160 | 195 | 250 | 190 | 180 | 88 | 93 | 190 |

TABLE 2-continued

|   | Comparative Example 1-1 | Example 1-1 | Example 1-2 | Example 1-3 | Example 1-4 | Example 1-5 | Comparative Example 1-2 | Comparative Example 1-3 | Comparative Example 1-4 | Comparative Example 1-5 |
|---|---|---|---|---|---|---|---|---|---|---|
| direction |  |  |  |  |  |  |  |  |  |  |
| Elastic modulus b in radial direction | 100 | 121 | 121 | 135 | 155 | 109 | 105 | 90 | 93 | 189 |
| Tensile strength | 100 | 85 | 86 | 86 | 83 | 82 | 75 | 83 | 95 | 65 |
| Fuel economy | 100 | 85 | 84 | 85 | 82 | 72 | 68 | 73 | 75 | 60 |
| Balance index | 100 | 114 | 116 | 143 | 170 | 112 | 92 | 53 | 66 | 74 |
| Processability | 100 | 100 | 101 | 102 | 102 | 100 | 99 | 100 | 100 | 82 |
| Flex crack growth resistance | 100 | 100 | 100 | 102 | 101 | 100 | 98 | 100 | 100 | 96 |

In Table 2, the "Amount of modified cellulose fiber (parts by mass)" means the amount (parts by mass) of the modified cellulose fiber relative to 100 parts by mass of the rubber component in the rubber composition.

Table 2 shows that, in Examples 1-1 to 1-5 using modified cellulose fiber-containing rubber compositions each of which contained a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C), the dispersibility of the cellulose fiber in rubber was improved so that elastic modulus was improved. The tensile strength, fuel economy, processability, and flex crack growth resistance in the examples were better than or equivalent to those in Comparative Example 1-2 in which a modified cellulose fiber (A) was contained but no dispersing polymer (B) was contained. In particular, the balance of elastic modulus, tensile strength, and fuel economy was improved in the examples. Thus, it was demonstrated that excellent rigidity, excellent tensile properties and low energy loss (rolling resistance) were simultaneously achieved and sufficient flex crack growth resistance was also ensured. This proves that a pneumatic tire including a sidewall formed from such a modified cellulose fiber-containing rubber composition has a good balance of excellent handling stability, rolling resistance, and durability and further has excellent flex crack growth resistance. It was further demonstrated that in such a rubber composition, the dispersibility of the cellulose fiber in rubber was improved so that excellent rigidity was achieved not only in the tire circumferential direction but also in the tire radial direction, which proves that the resulting pneumatic tire including a sidewall has very excellent handling stability.

It can be considered that reinforcing properties can be enhanced by using a large amount of carbon black, instead of using the cellulose fiber. However, as shown from the results of Comparative Example 1-5, the use of a large amount of carbon black can improve rigidity but fails to achieve a balanced improvement of rigidity, tensile properties, and rolling resistance and also shows poor processability.

<Base Tread>

The chemicals used in the examples and comparative examples are the same as those used in the <Sidewall>.

Examples 2-1 to 2-5

Comparative Examples 2-1 to 2-5

Unvulcanized rubber compositions and vulcanized rubber compositions were prepared as in Example 1-1, but using the formulations shown in Table 3.

Separately, each unvulcanized rubber composition was formed into the shape of a base tread and assembled with other tire components on a tire building machine to build an unvulcanized tire, which was then vulcanized to prepare a test tire (size: 195/65R15).

The unvulcanized rubber compositions, vulcanized rubber compositions, and test tires thus prepared were evaluated on the following items. Table 3 shows the results.

(Viscoelasticity Test)

A viscoelasticity test was performed as in Example 1-1, except that specimens were cut out of the base tread of the test tire, and the index (elastic modulus index) was calculated using the following equation.

(Elastic modulus $a$ index)=($E^*a$ of each formulation)/($E^*a$ of Comparative Example 2-1)×100

(Elastic modulus $b$ index)=($E^*b$ of each formulation)/($E^*b$ of Comparative Example 2-1)×100

(Tensile Test)

A tensile test was performed as in Example 1-1, except that the index (tensile strength index) was calculated using the following equation.

(Tensile strength index)=($EB \times TB$ of each formulation)/($EB \times TB$ of Comparative Example 2-1)×100

(Fuel Economy)

Fuel economy was evaluated as in Example 1-1, except that the index (fuel economy index) was calculated using the following equation.

(Fuel economy index)=(tan δ of Comparative Example 2-1)/(tan δ of each formulation)×100

(Tire Performance Balance Index)

The balance index was determined as in Example 1-1.

(Processability: Measurement of Mooney Viscosity)

Processability was evaluated as in Example 1-1, except that the index (Mooney viscosity index) was calculated using the following equation.

(Mooney viscosity index)=($ML_{1+4}$ of Comparative Example 2-1)/($ML_{1+4}$ of each formulation)×100

(Durability)

The test tire was placed in an oven and aged at 80° C. for three weeks. The aged test tire was run on a drum under overload conditions in which the load was 140% of the maximum load (maximum air pressure conditions) defined in the JIS standard, and then the running distance at which a bulge in the tread portion or other abnormalities occurred was determined. The running distance for each formulation is expressed as an index, with the running distance in Comparative Example 2-1 set equal to 100. A higher index indicates better durability.

direction but also in the tire radial direction, which proves that the resulting pneumatic tire including a base tread has very excellent handling stability.

TABLE 3

|  |  | Comparative Example 2-1 | Example 2-1 | Example 2-2 | Example 2-3 | Example 2-4 | Example 2-5 | Comparative Example 2-2 | Comparative Example 2-3 | Comparative Example 2-4 | Comparative Example 2-5 |
|---|---|---|---|---|---|---|---|---|---|---|---|
| Formulation (parts by mass) | X-1 | — | 10.75 | — | — | — | — | — | — | — | — |
|  | X-2 | — | — | 10.75 | — | — | — | — | — | — | — |
|  | X-3 | — | — | — | 12.25 | 24.5 | — | — | — | — | — |
|  | X-4 | — | — | — | — | — | 5.38 | 5.38 | — | — | — |
|  | X-5 | — | — | — | — | — | — | — | 5 | — | — |
|  | X-6 | — | — | — | — | — | 5 | — | — | 5 | — |
|  | Natural rubber | 70 | 70 | 70 | 70 | 70 | 70 | 70 | 70 | 70 | 70 |
|  | Polybutadiene rubber | 30 | 30 | 30 | 30 | 30 | 30 | 30 | 30 | 30 | 30 |
|  | Carbon black | 40 | 40 | 40 | 40 | 40 | 40 | 40 | 40 | 40 | 60 |
|  | Age resister | 2 | 2 | 2 | 2 | 2 | 2 | 2 | 2 | 2 | 2 |
|  | Oil | 5 | 5 | 5 | 5 | 5 | 5 | 5 | 5 | 5 | 5 |
|  | Zinc oxide | 2 | 2 | 2 | 2 | 2 | 2 | 2 | 2 | 2 | 2 |
|  | Stearic acid | 2 | 2 | 2 | 2 | 2 | 2 | 2 | 2 | 2 | 2 |
|  | Sulfur | 2 | 2 | 2 | 2 | 2 | 2 | 2 | 2 | 2 | 2 |
|  | Vulcanization accelerater | 1 | 1 | 1 | 1 | 1 | 1 | 1 | 1 | 1 | 1 |
| Amount of modified fiber (parts by mass) |  | — | 5 | 5 | 5 | 10 | 5 | 5 | — | — | — |
| Evaluation | Elastic modulus a in circumferential direction | 100 | 178 | 180 | 197 | 350 | 195 | 195 | 90 | 93 | 195 |
|  | Elastic modulus b in radial direction | 100 | 125 | 124 | 131 | 160 | 108 | 102 | 90 | 92 | 193 |
|  | Tensile strength | 100 | 85 | 85 | 85 | 78 | 80 | 80 | 88 | 90 | 68 |
|  | Fuel economy | 100 | 72 | 75 | 80 | 68 | 70 | 58 | 65 | 66 | 55 |
|  | Balance index | 100 | 109 | 115 | 134 | 186 | 109 | 90 | 51 | 55 | 73 |
|  | Processability | 100 | 100 | 100 | 102 | 101 | 100 | 98 | 100 | 100 | 80 |
|  | Durability | 100 | 102 | 103 | 107 | 112 | 100 | 98 | 97 | 98 | 93 |

In Table 3, the "Amount of modified cellulose fiber (parts by mass)" means the amount (parts by mass) of the modified cellulose fiber relative to 100 parts by mass of the rubber component in the rubber composition.

Table 3 shows that, in Examples 2-1 to 2-5 using modified cellulose fiber-containing rubber compositions each of which contained a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C), the dispersibility of the cellulose fiber in rubber was improved so that elastic modulus was improved. The tensile strength, fuel economy, processability, and tire durability in the examples were better than or equivalent to those in Comparative Example 2-2 in which a modified cellulose fiber (A) was contained but no dispersing polymer (B) was contained. In particular, the balance of elastic modulus, tensile strength, and fuel economy was improved in the examples. Thus, it was demonstrated that excellent rigidity, excellent tensile properties and low energy loss (rolling resistance) were simultaneously achieved and sufficient tire durability was also ensured. This proves that a pneumatic tire including a base tread formed from such a modified cellulose fiber-containing rubber composition has a good balance of excellent handling stability, rolling resistance, and durability and further has excellent tire durability. It was further demonstrated that in such a rubber composition, the dispersibility of the cellulose fiber in rubber was improved so that excellent rigidity was achieved not only in the tire circumferential It can be considered that reinforcing properties can be enhanced by using a large amount of carbon black, instead of using the cellulose fiber. However, as shown from the results of Comparative Example 2-5, the use of a large amount of carbon black can improve rigidity but fails to achieve a balanced improvement of rigidity, tensile properties, and rolling resistance and also shows poor processability.

<Breaker Topping>

Various chemicals used in examples and comparative examples are listed below.

X-1 to X-6: Resin compositions X-1 to X-6 prepared in Preparation Examples 1 to 6

Natural rubber: TSR20

Carbon black: Shoblack N550 ($N_2SA$: 42 $m^2/g$) available from Cabot Japan K. K.

Organic acid cobalt salt: Cost-F (cobalt stearate, cobalt content: 9.5% by mass) available from DIC Corporation Age resister: Nocrac 6C (N-phenyl-N'-(1,3-dimethylbutyl)-p-phenylenediamine, 6PPD) available from Ouchi Shinko Chemical Industrial Co., Ltd.

Oil: Diana Process AH-24 available from Idemitsu Kosan Co., Ltd.

Zinc oxide: Zinc oxide #2 available from Mitsui Mining and Smelting Co., Ltd.

Stearic acid: Stearic acid beads "Tsubaki" available from NOF Corporation

Sulfur: Seimi Sulfur (oil content: 10%) available from Nippon Kanryu Industry Co., Ltd.

Vulcanization accelerator: NOCCELER DZ (N,N'-dicyclohexyl-2-benzothiazole sulfenamide) available from Ouchi Shinko Chemical Industrial Co., Ltd.

Examples 3-1 to 3-5, Comparative Examples 3-1 to 3-5

Unvulcanized rubber compositions and vulcanized rubber compositions were prepared as in Example 1-1, but using the formulations shown in Table 4. Separately, each vulcanized rubber composition was subjected to hygrothermal aging at a temperature of 80° C. and a humidity of 95% for 150 hours to give a hygrothermally aged product.

Separately, each unvulcanized rubber composition was formed into the shape of a breaker topping and assembled with other tire components on a tire building machine to build an unvulcanized tire, which was then vulcanized to prepare a test tire (size: 195/65R15).

The unvulcanized rubber compositions, vulcanized rubber compositions (new products and hygrothermally aged products), and test tires thus prepared were evaluated on the following items. Table 4 shows the results.

(Viscoelasticity Test)

A viscoelasticity test was performed as in Example 1-1, except that specimens were cut out of the breaker topping of the test tire, and the index (elastic modulus index) was calculated using the following equation.

(Elastic modulus $a$ index)=($E^*a$ of each formulation)/($E^*a$ of Comparative Example 3-1)×100

(Elastic modulus $b$ index)=($E^*b$ of each formulation)/($E^*b$ of Comparative Example 3-1)×100

(Tensile Test)

A tensile test was performed as in Example 1-1, except that the index (tensile strength index) was calculated using the following equation.

(Tensile strength index)=($EB×TB$ of each formulation)/($EB×TB$ of Comparative Example 3-1)×100

(Fuel Economy)

Fuel economy was evaluated as in Example 1-1, except that the index (fuel economy index) was calculated using the following equation.

(Fuel economy index)=(tan δ of Comparative Example 3-1)/(tan δ of each formulation)×100

(Tire Performance Balance Index)

The balance index was determined as in Example 1-1.

(Processability: Measurement of Mooney Viscosity)

Processability was evaluated as in Example 1-1, except that the index (Mooney viscosity index) was calculated using the following equation.

(Mooney viscosity index)=($ML_{1+4}$ of Comparative Example 3-1)/($ML_{1+4}$ of each formulation)×100

(Adhesion Test (Rating of Rubber Attachment after Peeling))

Samples for peeling test prepared from the vulcanized rubber compositions (new product, hygrothermally aged product) were subjected to an adhesion test to measure rubber coverage after peeling (the percentage of rubber coverage on the peeled surface when the rubber was peeled from steel cords). The results are presented on a 5-point scale. A score of 5 points indicates full coverage, and a score of 0 points indicates no coverage. A higher score indicates better adhesion to steel cords. If the score is 3 or higher for new products, and 2+ or higher for aged products, the product is practically acceptable.

TABLE 4

| | | Comparative Example 3-1 | Example 3-1 | Example 3-2 | Example 3-3 | Example 3-4 | Example 3-5 | Comparative Example 3-2 | Comparative Example 3-3 | Comparative Example 3-4 | Comparative Example 3-5 |
|---|---|---|---|---|---|---|---|---|---|---|---|
| Formulation (parts by mass) | X-1 | — | 10.75 | — | — | — | — | — | — | — | — |
| | X-2 | — | — | 10.75 | — | — | — | — | — | — | — |
| | X-3 | — | — | — | 12.25 | 24.5 | — | — | — | — | — |
| | X-4 | — | — | — | — | — | 5.38 | 5.38 | — | — | — |
| | X-5 | — | — | — | — | — | — | — | 5 | — | — |
| | X-6 | — | — | — | — | — | 5 | — | — | 5 | — |
| | Natural rubber | 100 | 100 | 100 | 100 | 100 | 100 | 100 | 100 | 100 | 100 |
| | Carbon black | 60 | 60 | 60 | 60 | 60 | 60 | 60 | 60 | 60 | 90 |
| | Organic acid cobalt salt | 2 | 2 | 2 | 2 | 2 | 2 | 2 | 2 | 2 | 2 |
| | Age resister | 2 | 2 | 2 | 2 | 2 | 2 | 2 | 2 | 2 | 2 |
| | Oil | 5 | 5 | 5 | 5 | 5 | 5 | 5 | 5 | 5 | 5 |
| | Zinc oxide | 6 | 6 | 6 | 6 | 6 | 6 | 6 | 6 | 6 | 6 |
| | Stearic acid | 2 | 2 | 2 | 2 | 2 | 2 | 2 | 2 | 2 | 2 |
| | Sulfur | 5 | 5 | 5 | 5 | 5 | 5 | 5 | 5 | 5 | 5 |
| | Vulcanization accelerator | 1 | 1 | 1 | 1 | 1 | 1 | 1 | 1 | 1 | 1 |
| Amount of modified cellulose fiber (parts by mass) | | — | 5 | 5 | 5 | 10 | 5 | 5 | — | — | — |
| Evaluation | Elastic modulus a in circumferential direction | 100 | 155 | 160 | 190 | 300 | 180 | 178 | 88 | 90 | 160 |
| | Elastic modulus b in radial direction | 100 | 120 | 122 | 129 | 159 | 113 | 105 | 88 | 90 | 159 |
| | Tensile strength | 100 | 81 | 82 | 80 | 78 | 78 | 76 | 83 | 85 | 72 |
| | Fuel economy | 100 | 83 | 85 | 88 | 80 | 75 | 63 | 68 | 70 | 60 |
| | Balance index | 100 | 104 | 112 | 134 | 187 | 105 | 85 | 50 | 54 | 69 |
| | Processability | 100 | 100 | 101 | 102 | 101 | 100 | 98 | 99 | 100 | 81 |
| | Adhesion to cords (new product) | 5 | 4 | 4 | 4 | 4 | 3 | 3 | 3 | 3 | 2 |
| | Adhesion to cords (hygrothermally aged product) | 4 | 3 | 3 | 3 | 3 | 2+ | 2+ | 2 | 2 | 1 |

In Table 4, the "Amount of modified cellulose fiber (parts by mass) means the amount (parts by mass) of the modified cellulose fiber relative to 100 parts by mass of the rubber component in the rubber composition.

Table 4 shows that, in Examples 3-1 to 3-5 using modified cellulose fiber-containing rubber compositions each of which contained a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C), the dispersibility of the cellulose fiber in rubber was improved so that elastic modulus was improved. The tensile strength, fuel economy, processability, and adhesion in the examples were better than or equivalent to those in Comparative Example 3-2 in which a modified cellulose fiber (A) was contained but no dispersing polymer (B) was contained. In particular, the balance of elastic modulus, tensile strength, and fuel economy was improved in the examples. Thus, it was demonstrated that excellent rigidity, excellent tensile properties and low energy loss (rolling resistance) were simultaneously achieved and sufficient adhesion was also ensured. This proves that a pneumatic tire including a breaker topping formed from such a modified cellulose fiber-containing rubber composition has a good balance of excellent handling stability, rolling resistance, and durability and further has excellent adhesion. It was further demonstrated that in such a rubber composition, the dispersibility of the cellulose fiber in rubber was improved so that excellent rigidity was achieved not only in the tire circumferential direction but also in the tire radial direction, which proves that the resulting pneumatic tire including a breaker topping has very excellent handling stability.

It can be considered that reinforcing properties can be enhanced by using a large amount of carbon black, instead of using the cellulose fiber. However, as shown from the results of Comparative Example 3-5, the use of a large amount of carbon black can improve rigidity but fails to achieve a balanced improvement of rigidity, tensile properties, and rolling resistance and also shows poor processability.

<Innerliner>

Various chemicals used in examples and comparative examples are listed below.

X-1 to X-6: Resin compositions X-1 to X-6 prepared in Preparation Examples 1 to 6

Natural rubber: TSR20

Butyl-based rubber: Exxon Chlorobutyl 1066 (chlorinated butyl rubber) available from Exxon Mobil Corporation Carbon black: Seast V (N660, $N_2SA$: 27 $m^2/g$) available from Tokai Carbon Co., Ltd.

Age resister: Nocrac 6C (N-phenyl-N'-(1, 3-dimethylbutyl)-p-phenylenediamine, 6PPD) available from Ouchi Shinko Chemical Industrial Co., Ltd.

Zinc oxide: Zinc oxide #2 available from Mitsui Mining and Smelting Co., Ltd.

Stearic acid: Stearic acid beads "Tsubaki" available from NOF Corporation

Sulfur: Seimi Sulfur (oil content: 10%) available from Nippon Kanryu Industry Co., Ltd.

Vulcanization accelerator: NOCCELER NS (N-t-butyl-2-benzothiazole sulfenamide, TBBS) available from Ouchi Shinko Chemical Industrial Co., Ltd.

Examples 4-1 to 4-5, Comparative Examples 4-1 to 4-4

Unvulcanized rubber compositions and vulcanized rubber compositions were prepared as in Example 1-1, but using the formulations shown in Table 5.

The unvulcanized rubber compositions and vulcanized rubber compositions thus prepared were evaluated on the following items. Table 5 shows the results.

(Air Permeation Resistance)

Rubber specimens having a diameter of 90 mm and a thickness of 1 mm were prepared from the vulcanized rubber compositions. Air permeability coefficients (cc·cm/cm²·sec/cmHg) were determined in accordance with ASTM D-1434-75M and expressed as an index (air permeation resistance index) using the equation below, with the air permeability coefficient of Comparative Example 4-1 taken as a reference (=100). A higher index indicates lower air permeation and better air permeation resistance.

(Air permeation resistance index)=(Air permeability coefficient of Comparative Example 4-1)/(Air permeability coefficient of each formulation)×100

(Tensile Test)

A tensile test was performed as in Example 1-1, except that the index (tensile strength index) was calculated using the following equation.

(Tensile strength index)=($EB \times TB$ of each formulation)/($EB \times TB$ of Comparative Example 4-1)×100

(Fuel Economy)

Fuel economy was evaluated as in Example 1-1, except that the index (fuel economy index) was calculated using the following equation.

(Fuel economy index)=(tan δ of Comparative Example 4-1)/(tan δ of each formulation)×100

(Processability: Measurement of Mooney Viscosity)

Processability was evaluated as in Example 1-1, except that the index (Mooney viscosity index) was calculated using the following equation.

(Mooney viscosity index)=($ML_{1+4}$ of Comparative Example 4-1)/($ML_{1+4}$ of each formulation)×100

TABLE 5

|  |  | Comparative Example 4-1 | Example 4-1 | Example 4-2 | Example 4-3 | Example 4-4 | Example 4-5 | Comparative Example 4-2 | Comparative Example 4-3 | Comparative Example 4-4 |
|---|---|---|---|---|---|---|---|---|---|---|
| Formulation (parts by mass) | X-1 | — | 10.75 | — | — | — | — | — | — | — |
|  | X-2 | — | — | 10.75 | — | — | — | — | — | — |
|  | X-3 | — | — | — | 12.25 | 24.5 | — | — | — | — |
|  | X-4 | — | — | — | — | — | 5.38 | 5.38 | — | — |
|  | X-5 | — | — | — | — | — | — | — | 5 | — |
|  | X-6 | — | — | — | — | — | 5 | — | — | 5 |
|  | Natural rubber | 20 | 20 | 20 | 20 | 20 | 20 | 20 | 20 | 20 |
|  | Butyl-based rubber | 80 | 80 | 80 | 80 | 80 | 80 | 80 | 80 | 80 |

TABLE 5-continued

|  |  | Comparative Example 4-1 | Example 4-1 | Example 4-2 | Example 4-3 | Example 4-4 | Example 4-5 | Comparative Example 4-2 | Comparative Example 4-3 | Comparative Example 4-4 |
|---|---|---|---|---|---|---|---|---|---|---|
|  | Carbon black | 50 | 50 | 50 | 50 | 50 | 50 | 50 | 50 | 50 |
|  | Age resister | 1 | 1 | 1 | 1 | 1 | 1 | 1 | 1 | 1 |
|  | Zinc oxide | 4 | 4 | 4 | 4 | 4 | 4 | 4 | 4 | 4 |
|  | Stearic acid | 2 | 2 | 2 | 2 | 2 | 2 | 2 | 2 | 2 |
|  | Sulfur | 1 | 1 | 1 | 1 | 1 | 1 | 1 | 1 | 1 |
|  | Vulcanization accelerator | 1 | 1 | 1 | 1 | 1 | 1 | 1 | 1 | 1 |
| Amount of modified cellulose fiber (parts by mass) | | — | 5 | 5 | 5 | 10 | 5 | 5 | — | — |
| Evaluation | Air permeation resistance | 100 | 120 | 120 | 128 | 138 | 114 | 98 | 95 | 95 |
|  | Tensile strength | 100 | 99 | 100 | 102 | 101 | 100 | 100 | 89 | 90 |
|  | Fuel economy | 100 | 101 | 100 | 101 | 100 | 99 | 100 | 83 | 85 |
|  | Processabilrty | 100 | 100 | 101 | 102 | 102 | 101 | 97 | 96 | 95 |

In Table 5, the "Amount of modified cellulose fiber (parts by mass)" means the amount (parts by mass) of the modified cellulose fiber relative to 100 parts by mass of the rubber component in the rubber composition.

Table 5 shows that, in Examples 4-1 to 4-5 using modified cellulose fiber-containing rubber compositions each of which contained a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C), the dispersibility of the cellulose fiber in rubber was improved so that air permeation resistance was improved. The tensile strength, fuel economy, and processability in the examples were better than or equivalent to those in Comparative Example 4-2 in which a modified cellulose fiber (A) was contained but no dispersing polymer (B) was contained. Thus, it was demonstrated that excellent air permeation resistance, excellent tensile properties, and low energy loss (rolling resistance) were simultaneously achieved. This proves that a pneumatic tire including an innerliner formed from such a modified cellulose fiber-containing rubber composition is excellent in air permeation resistance, rolling resistance, and durability.

<Bead Apex>

Various chemicals used in examples and comparative examples are listed below.

X-1 to X-6: Resin compositions X-1 to X-6 prepared in Preparation Examples 1 to 6

Natural rubber: TSR20

Styrene-butadiene rubber: Nipol 1502 (E-SBR, styrene content: 23.5% by mass, $ML_{1+4}$ (100° C.): 52) available from Zeon Corporation Carbon black: Seast N (N330, $N_2SA$: 74 m²/g, DBP oil absorption: 102 mL/100 g) available from Tokai Carbon Co., Ltd.

Age resister: Nocrac 6C (N-phenyl-N'-(1,3-dimethylbutyl)-p-phenylenediamine, 6PPD) available from Ouchi Shinko Chemical Industrial Co., Ltd.

Oil: Diana Process AH-24 available from Idemitsu Kosan Co., Ltd.

Resin: PR12686 (cashew oil-modified phenol resin) available from Sumitomo Bakelite Co., Ltd.

Zinc oxide: Zinc oxide #2 available from Mitsui Mining and Smelting Co., Ltd.

Stearic acid: Stearic acid beads "Tsubaki" available from NOF Corporation

Sulfur: Seimi Sulfur (oil content: 10%) available from Nippon Kanryu Industry Co., Ltd.

Vulcanization accelerator: NOCCELER NS (N-t-butyl-2-benzothiazole sulfenamide, TBBS) available from Ouchi Shinko Chemical Industrial Co., Ltd.

Examples 5-1 to 5-5, Comparative Examples 5-1 to 5-5

Unvulcanized rubber compositions and vulcanized rubber compositions were prepared as in Example 1-1, but using the formulations shown in Table 6.

Separately, each unvulcanized rubber composition was formed into the shape of a bead apex and assembled with other tire components on a tire building machine to build an unvulcanized tire, which was then vulcanized to prepare a test tire (size: 195/65R15).

The unvulcanized rubber compositions, vulcanized rubber compositions, and test tires thus prepared were evaluated on the following items. Table 6 shows the results.

(Viscoelasticity Test)

A viscoelasticity test was performed as in Example 1-1, except that specimens were cut out of the bead apex of the test tire, and the index (elastic modulus index) was calculated using the following equation.

(Elastic modulus $a$ index)=($E^*a$ of each formulation)/($E^*a$ of Comparative Example 5-1)×100

(Elastic modulus $b$ index)=($E^*b$ of each formulation)/($E^*b$ of Comparative Example 5-1)×100

(Tensile Test)

A tensile test was performed as in Example 1-1, except that the index (tensile strength index) was calculated using the following equation.

(Tensile strength index)=($EB \times TB$ of each formulation)/($EB \times TB$ of Comparative Example 5-1)×100

(Fuel Economy)

Fuel economy was evaluated as in Example 1-1, except that the index (fuel economy index) was calculated using the following equation.

(Fuel economy index)=(tan δ of Comparative Example 5-1)/(tan δ of each formulation)×100

(Tire Performance Balance Index)

The balance index was determined as in Example 1-1.

(Processability: Measurement of Mooney Viscosity)

Processability was evaluated as in Example 1-1, except that the index (Mooney viscosity index) was calculated using the following equation.

(Mooney viscosity index)=($ML_{1+4}$ of Comparative Example 5-1)/($ML_{1+4}$ of each formulation)×100

TABLE 6

| | | Comparative Example 5-1 | Example 5-1 | Example 5-2 | Example 5-3 | Example 5-4 | Example 5-5 | Comparative Example 5-2 | Comparative Example 5-3 | Comparative Example 5-4 | Comparative Example 5-5 |
|---|---|---|---|---|---|---|---|---|---|---|---|
| Formulation (parts by mass) | X-1 | — | 10.75 | — | — | — | — | — | — | — | — |
| | X-2 | — | — | 10.75 | — | — | — | — | — | — | — |
| | X-3 | — | — | — | 12.25 | 24.5 | — | — | — | — | — |
| | X-4 | — | — | — | — | — | 5.38 | 5.38 | — | — | — |
| | X-5 | — | — | — | — | — | — | — | 5 | — | — |
| | X-6 | — | — | — | — | — | 5 | — | — | 5 | — |
| | Natural rubber | 80 | 80 | 80 | 80 | 80 | 80 | 80 | 80 | 80 | 80 |
| | Styrene-butadiene rubber | 20 | 20 | 20 | 20 | 20 | 20 | 20 | 20 | 20 | 20 |
| | Carbon black | 60 | 60 | 60 | 60 | 60 | 60 | 60 | 60 | 60 | 90 |
| | Age resister | 2 | 2 | 2 | 2 | 2 | 2 | 2 | 2 | 2 | 2 |
| | Oil | 2 | 2 | 2 | 2 | 2 | 2 | 2 | 2 | 2 | 2 |
| | Resin | 10 | 10 | 10 | 10 | 10 | 10 | 10 | 10 | 10 | 10 |
| | Zinc oxide | 4 | 4 | 4 | 4 | 4 | 4 | 4 | 4 | 4 | 4 |
| | Stearic acid | 2 | 2 | 2 | 2 | 2 | 2 | 2 | 2 | 2 | 2 |
| | Sulfur | 1 | 1 | 1 | 1 | 1 | 1 | 1 | 1 | 1 | 1 |
| | Vulcanization accelerator | 1 | 1 | 1 | 1 | 1 | 1 | 1 | 1 | 1 | 1 |
| Amount of modified cellulose fiber (parts by mass) | | — | 5 | 5 | 5 | 10 | 5 | 5 | — | — | — |
| Evaluation | Elastic modulus a in circumferential direction | 100 | 149 | 150 | 155 | 197 | 145 | 146 | 91 | 93 | 150 |
| | Elastic modulus b in radial direction | 100 | 121 | 120 | 125 | 145 | 108 | 102 | 90 | 94 | 150 |
| | Tensile strength | 100 | 91 | 94 | 93 | 95 | 90 | 85 | 86 | 88 | 75 |
| | Fuel economy | 100 | 85 | 86 | 87 | 75 | 84 | 75 | 82 | 83 | 65 |
| | Balance index | 100 | 115 | 121 | 125 | 140 | 110 | 93 | 64 | 68 | 73 |
| | Processability | 100 | 100 | 101 | 101 | 103 | 100 | 97 | 100 | 99 | 80 |

In Table 6, the "Amount of modified cellulose fiber (parts by mass)" means the amount (parts by mass) of the modified cellulose fiber relative to 100 parts by mass of the rubber component in the rubber composition.

Table 6 shows that, in Examples 5-1 to 5-5 using modified cellulose fiber-containing rubber compositions each of which contained a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C), the dispersibility of the cellulose fiber in rubber was improved so that elastic modulus was improved. The tensile strength, fuel economy, and processability in the examples were better than or equivalent to those in Comparative Example 5-2 in which a modified cellulose fiber (A) was contained but no dispersing polymer (B) was contained. In particular, the balance of elastic modulus, tensile strength, and fuel economy was improved in the examples. Thus, it was demonstrated that excellent rigidity, excellent tensile properties, and low energy loss (rolling resistance) were simultaneously achieved. This proves that a pneumatic tire including a bead apex formed from such a modified cellulose fiber-containing rubber composition has a good balance of excellent handling stability, rolling resistance, and durability. It was further demonstrated that in such a rubber composition, the dispersibility of the cellulose fiber in rubber was improved so that excellent rigidity was achieved not only in the tire circumferential direction but also in the tire radial direction in the bead apex, which proves that the resulting pneumatic tire has very excellent handling stability.

It can be considered that reinforcing properties can be enhanced by using a large amount of carbon black, instead of using the cellulose fiber. However, as shown from the results of Comparative Example 5-5, the use of a large amount of carbon black can improve rigidity but fails to achieve a balanced improvement of rigidity, tensile properties, and rolling resistance and also shows poor processability.

<Clinch Apex>

Various chemicals used in examples and comparative examples are listed below.

X-1 to X-6: Resin compositions X-1 to X-6 prepared in Preparation Examples 1 to 6

Natural rubber: TSR20

Polybutadiene rubber: BR150B (cis content: 97% by mass, $ML_{1+4}$ (100° C.): 40) available from Ube Industries, Ltd.

Carbon black: Seast N (N330, $N_2SA$: 74 m²/g, DBP oil absorption: 102 mL/100 g) available from Tokai Carbon Co., Ltd.

Age resister: Nocrac 6C (N-phenyl-N'-(1,3-dimethylbutyl)-p-phenylenediamine, 6PPD) available from Ouchi Shinko Chemical Industrial Co., Ltd.

Oil: Diana Process AH-24 available from Idemitsu Kosan Co., Ltd.

Zinc oxide: Zinc oxide #2 available from Mitsui Mining and Smelting Co., Ltd.

Stearic acid: Stearic acid beads "Tsubaki" available from NOF Corporation

Sulfur: Seimi Sulfur (oil content: 10%) available from Nippon Kanryu Industry Co., Ltd.

Vulcanization accelerator: NOCCELER NS (N-t-butyl-2-benzothiazole sulfenamide, TBBS) available from Ouchi Shinko Chemical Industrial Co., Ltd.

Examples 6-1 to 6-5, Comparative Examples 6-1 to 6-5

Unvulcanized rubber compositions and vulcanized rubber compositions were prepared as in Example 1-1, but using the formulations shown in Table 7.

Separately, each unvulcanized rubber composition was formed into the shape of a clinch apex and assembled with other tire components on a tire building machine to build an unvulcanized tire, which was then vulcanized to prepare a test tire (size: 195/65R15).

The unvulcanized rubber compositions, vulcanized rubber compositions, and test tires thus prepared were evaluated on the following items. Table 7 shows the results.

(Viscoelasticity Test)

A viscoelasticity test was performed as in Example 1-1, except that specimens were cut out of the clinch apex of the test tire, and the index (elastic modulus index) was calculated using the following equation.

(Elastic modulus $a$ index)=($E^*a$ of each formulation)/($E^*a$ of Comparative Example 6-1)×100

(Elastic modulus $b$ index)=($E^*b$ of each formulation)/($E^*b$ of Comparative Example 6-1)×100

(Tensile Test)

A tensile test was performed as in Example 1-1, except that the index (tensile strength index) was calculated using the following equation.

(Tensile strength index)=($EB \times TB$ of each formulation)/($EB \times TB$ of Comparative Example 6-1)×100

(Fuel Economy)

Fuel economy was evaluated as in Example 1-1, except that the index (fuel economy index) was calculated using the following equation.

(Fuel economy index)=(tan δ of Comparative Example 6-1)/(tan δ of each formulation)×100

(Tire Performance Balance Index)

The balance index was determined as in Example 1-1.

(Processability: Measurement of Mooney Viscosity)

Processability was evaluated as in Example 1-1, except that the index (Mooney viscosity index) was calculated using the following equation.

(Mooney viscosity index)=($ML_{1+4}$ of Comparative Example 6-1)/($ML_{1+4}$ of each formulation)×100

TABLE 7

| | | Comparative Example 6-1 | Example 6-1 | Example 6-2 | Example 6-3 | Example 6-4 | Example 6-5 | Comparative Example 6-2 | Comparative Example 6-3 | Comparative Example 6-4 | Comparative Example 6-5 |
|---|---|---|---|---|---|---|---|---|---|---|---|
| Formulation (parts by mass) | X-1 | — | 10.75 | — | — | — | — | — | — | — | — |
| | X-2 | — | — | 10.75 | — | — | — | — | — | — | — |
| | X-3 | — | — | — | 12.25 | 24.5 | — | — | — | — | — |
| | X-4 | — | — | — | — | — | 5.38 | 5.38 | — | — | — |
| | X-5 | — | — | — | — | — | — | — | 5 | — | — |
| | X-6 | — | — | — | — | — | 5 | — | — | 5 | — |
| | Natural rubber | 50 | 50 | 50 | 50 | 50 | 50 | 50 | 50 | 50 | 50 |
| | Polybutadiene rubber | 50 | 50 | 50 | 50 | 50 | 50 | 50 | 50 | 50 | 50 |
| | Carbon black | 60 | 60 | 60 | 60 | 60 | 60 | 60 | 60 | 60 | 90 |
| | Age resister | 1 | 1 | 1 | 1 | 1 | 1 | 1 | 1 | 1 | 1 |
| | Oil | 8 | 8 | 8 | 8 | 8 | 8 | 8 | 8 | 8 | 8 |
| | Zinc oxide | 4 | 4 | 4 | 4 | 4 | 4 | 4 | 4 | 4 | 4 |
| | Stearic acid | 1 | 1 | 1 | 1 | 1 | 1 | 1 | 1 | 1 | 1 |
| | Sulfur | 1.5 | 1.5 | 1.5 | 1.5 | 1.5 | 1.5 | 1.5 | 1.5 | 1.5 | 1.5 |
| | Vulcanization accelerator | 1.5 | 1.5 | 1.5 | 1.5 | 1.5 | 1.5 | 1.5 | 1.5 | 1.5 | 1.5 |
| Amount of modified cellulose fiber (parts by mass) | | — | 5 | 5 | 5 | 10 | 5 | 5 | — | — | — |
| Evaluation | Elastic modulus a in circumferential direction | 100 | 168 | 172 | 185 | 248 | 165 | 155 | 91 | 93 | 170 |
| | Elastic modulus b in radial direction | 100 | 121 | 125 | 129 | 148 | 110 | 100 | 90 | 92 | 169 |
| | Tensile strength | 100 | 82 | 83 | 88 | 78 | 82 | 80 | 85 | 90 | 73 |
| | Fuel economy | 100 | 77 | 78 | 85 | 76 | 75 | 68 | 82 | 85 | 63 |
| | Balance index | 100 | 106 | 111 | 138 | 147 | 101 | 84 | 63 | 71 | 78 |
| | Processability | 100 | 100 | 101 | 102 | 101 | 100 | 98 | 100 | 100 | 80 |

In Table 7, the "Amount of modified cellulose fiber (parts by mass)" means the amount (parts by mass) of the modified cellulose fiber relative to 100 parts by mass of the rubber component in the rubber composition.

Table 7 shows that, in Examples 6-1 to 6-5 using modified cellulose fiber-containing rubber compositions each of which contained a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C), the dispersibility of the cellulose fiber in rubber was improved so that elastic modulus was improved. The tensile strength, fuel economy, and processability in the examples were better than or equivalent to those in Comparative Example 6-2 in which a modified cellulose fiber (A) was contained but no dispersing polymer (B) was contained. In particular, the balance of elastic modulus, tensile strength, and fuel economy was improved in the examples. Thus, it was demonstrated that excellent rigidity, excellent tensile properties, and low energy loss (rolling resistance) were simultaneously achieved. This proves that a pneumatic tire including a clinch apex formed from such a modified cellulose fiber-containing rubber composition has a good balance of excellent handling stability, rolling resistance, and durability. It was further demonstrated that in such a rubber composition, the dispersibility of the cellulose fiber in rubber was improved so that excellent rigidity was achieved not only in the tire circumferential direction but also in the tire radial direction in the clinch apex, which proves that the resulting pneumatic tire has very excellent handling stability.

It can be considered that reinforcing properties can be enhanced by using a large amount of carbon black, instead of using the cellulose fiber. However, as shown from the results of Comparative Example 6-5, the use of a large amount of carbon black can improve rigidity but fails to achieve a balanced improvement of rigidity, tensile properties, and rolling resistance and also shows poor processability.

<Ply Topping>

Various chemicals used in examples and comparative examples are listed below.

X-1 to X-6: Resin compositions X-1 to X-6 prepared in Preparation Examples 1 to 6

Natural rubber: TSR20

Styrene-butadiene rubber: Nipol 1502 (E-SBR, styrene content: 23.5% by mass, vinyl content: 18% by mass) available from Zeon Corporation Carbon black: Shoblack N550 ($N_2SA$: 42 m²/g, average particle size: 48 nm, DBP oil absorption: 113 mL/100 g) available from Cabot Japan K. K.

Age resister: Nocrac 6C (N-phenyl-N'-(1,3-dimethylbutyl)-p-phenylenediamine, 6PPD) available from Ouchi Shinko Chemical Industrial Co., Ltd.

Oil: Diana Process AH-24 available from Idemitsu Kosan Co., Ltd.

Zinc oxide: Zinc oxide #2 available from Mitsui Mining and Smelting Co., Ltd.

Stearic acid: Stearic acid beads "Tsubaki" available from NOF Corporation

Sulfur: Seimi Sulfur (oil content: 10%) available from Nippon Kanryu Industry Co., Ltd.

Vulcanization accelerator: NOCCELER DZ (N,N'-dicyclohexyl-2-benzothiazole sulfenamide) available from Ouchi Shinko Chemical Industrial Co., Ltd.

Examples 7-1 to 7-5, Comparative Examples 7-1 to 7-5

Unvulcanized rubber compositions and vulcanized rubber compositions were prepared as in Example 1-1, but using the formulations shown in Table 8.

Separately, each unvulcanized rubber composition was formed into the shape of a ply topping and assembled with other tire components on a tire building machine to build an unvulcanized tire, which was then vulcanized to prepare a test tire (size: 195/65R15).

The unvulcanized rubber compositions, vulcanized rubber compositions, and test tires thus prepared were evaluated on the following items. Table 8 shows the results.

(Viscoelasticity Test)

A viscoelasticity test was performed as in Example 1-1, except that specimens were cut out of the ply topping of the test tire, and the index (elastic modulus index) was calculated using the following equation.

(Elastic modulus $a$ index)=($E^*a$ of each formulation)/($E^*a$ of Comparative Example 7-1)×100

(Elastic modulus $b$ index)=($E^*b$ of each formulation)/($E^*b$ of Comparative Example 7-1)×100

(Tensile Test)

A tensile test was performed as in Example 1-1, except that the index (tensile strength index) was calculated using the following equation.

(Tensile strength index)=($EB \times TB$ of each formulation)/($EB \times TB$ of Comparative Example 7-1)×100

(Fuel Economy)

Fuel economy was evaluated as in Example 1-1, except that the index (fuel economy index) was calculated using the following equation.

(Fuel economy index)=(tan δ of Comparative Example 7-1)/(tan δ of each formulation)×100

(Tire Performance Balance Index)

The balance index was determined as in Example 1-1.

(Adhesion Strength)

Eight cords were arranged at regular intervals of 10 mm and a 0.7 mm-thick topping rubber (unvulcanized rubber composition) was press-bonded to both sides of the arranged cords. After the rubberized cords were stored at 60% humidity, two sheets of the resulting rubberized cords were attached to each other at an angle of 90 degrees, and then a reinforcing rubber was press-bonded to both sides of the stack. The resulting bonded product was shaped into a rectangle to match the shape of a mold for vulcanization. After the bonded product was vulcanized in the mold at 165° C. for 20 minutes, a slit was formed between the bonded two rubberized cord sheets in the vulcanized product, and then the sheets were pulled at 180 degrees at a rate of 50 ram/min using a tensile tester available from Instron to evaluate the peel force (kN/25 mm) between the rubberized cords. The peel force was expressed as an index, with the peel force of Comparative Example 7-1 set equal to 100. A higher index indicates better adhesion between cords and the topping rubber and better durability.

(Processability: Measurement of Mooney Viscosity)

Processability was evaluated as in Example 1-1, except that the index (Mooney viscosity index) was calculated using the following equation.

(Mooney viscosity index)=($ML_{1+4}$ of Comparative Example 7-1)/($ML_{1+4}$ of each formulation)×100

TABLE 8

| | | Comparative Example 7-1 | Example 7-1 | Example 7-2 | Example 7-3 | Example 7-4 | Example 7-5 | Comparative Example 7-2 | Comparative Example 7-3 | Comparative Example 7-4 | Comparative Example 7-5 |
|---|---|---|---|---|---|---|---|---|---|---|---|
| Formulation (parts by mass) | X-1 | — | 10.75 | — | — | — | — | — | — | — | — |
| | X-2 | — | — | 10.75 | — | — | — | — | — | — | — |
| | X-3 | — | — | — | 12.25 | 24.5 | — | — | — | — | — |
| | X-4 | — | — | — | — | — | 5.38 | 5.38 | — | — | — |
| | X-5 | — | — | — | — | — | — | — | 5 | — | — |

TABLE 8-continued

|  |  | Comparative Example 7-1 | Example 7-1 | Example 7-2 | Example 7-3 | Example 7-4 | Example 7-5 | Comparative Example 7-2 | Comparative Example 7-3 | Comparative Example 7-4 | Comparative Example 7-5 |
|---|---|---|---|---|---|---|---|---|---|---|---|
|  | X-6 | — | — | — | — | — | 5 | — | — | 5 | — |
|  | Natural rubber | 70 | 70 | 70 | 70 | 70 | 70 | 70 | 70 | 70 | 70 |
|  | Styrene-butadiene rubber | 30 | 30 | 30 | 30 | 30 | 30 | 30 | 30 | 30 | 30 |
|  | Carbon black | 50 | 50 | 50 | 50 | 50 | 50 | 50 | 50 | 50 | 80 |
|  | Age resister | 2 | 2 | 2 | 2 | 2 | 2 | 2 | 2 | 2 | 2 |
|  | Oil | 6 | 6 | 6 | 6 | 6 | 6 | 6 | 6 | 6 | 6 |
|  | Zinc oxide | 4 | 4 | 4 | 4 | 4 | 4 | 4 | 4 | 4 | 4 |
|  | Stearic acid | 2 | 2 | 2 | 2 | 2 | 2 | 2 | 2 | 2 | 2 |
|  | Sulfur | 3 | 3 | 3 | 3 | 3 | 3 | 3 | 3 | 3 | 3 |
|  | Vulcanization accelerator | 1 | 1 | 1 | 1 | 1 | 1 | 1 | 1 | 1 | 1 |
| Amount of modified cellulose fiber (parts by mass) |  | — | 5 | 5 | 5 | 10 | 5 | 5 | — | — | — |
| Evaluation | Elastic modulus a in circumferential direction | 100 | 170 | 175 | 200 | 315 | 170 | 168 | 92 | 93 | 180 |
|  | Elastic modulus b in radial direction | 100 | 117 | 118 | 140 | 165 | 109 | 100 | 93 | 92 | 181 |
|  | Tensile strength | 100 | 81 | 82 | 85 | 78 | 78 | 73 | 86 | 88 | 67 |
|  | Fuel economy | 100 | 79 | 80 | 83 | 75 | 76 | 68 | 79 | 80 | 58 |
|  | Balance index | 100 | 109 | 115 | 141 | 184 | 101 | 83 | 63 | 65 | 70 |
|  | Adhesion strength | 100 | 101 | 100 | 100 | 101 | 100 | 96 | 80 | 100 | 97 |
|  | Processability | 100 | 100 | 101 | 100 | 102 | 100 | 98 | 100 | 100 | 81 |

In Table 8, the "Amount of modified cellulose fiber (parts by mass)" means the amount (parts by mass) of the modified cellulose fiber relative to 100 parts by mass of the rubber component in the rubber composition.

Table 8 shows that, in Examples 7-1 to 7-5 using modified cellulose fiber-containing rubber compositions each of which contained a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C), the dispersibility of the cellulose fiber in rubber was improved so that elastic modulus was improved. The tensile strength, fuel economy, adhesion strength, and processability in the examples were better than or equivalent to those in Comparative Example 7-2 in which a modified cellulose fiber (A) was contained but no dispersing polymer (B) was contained. In particular, the balance of elastic modulus, tensile strength, and fuel economy was improved in the examples. Thus, it was demonstrated that excellent rigidity, excellent tensile properties, and low energy loss (rolling resistance) were simultaneously achieved. This proves that a pneumatic tire including a ply topping formed from such a modified cellulose fiber-containing rubber composition has a good balance of excellent handling stability, rolling resistance, and durability. It was further demonstrated that in such a rubber composition, the dispersibility of the cellulose fiber in rubber was improved so that excellent rigidity was achieved not only in the tire circumferential direction but also in the tire radial direction in the ply topping, which proves that the resulting pneumatic tire has very excellent handling stability.

It can be considered that reinforcing properties can be enhanced by using a large amount of carbon black, instead of using the cellulose fiber. However, as shown from the results of Comparative Example 7-5, the use of a large amount of carbon black can improve rigidity but fails to achieve a balanced improvement of rigidity, tensile properties, and rolling resistance and also shows poor processability.

<Tread>

Various chemicals used in examples and comparative examples are listed below.

X-1 to X-6: Resin compositions X-1 to X-6 prepared in Preparation Examples 1 to 6

Natural rubber: TSR20

Styrene-butadiene rubber: Nipol 1502 (E-SBR, styrene content: 23.5% by mass, $ML_{1+4}$ (100° C.): 52) available from Zeon Corporation Carbon black: Shoblack N550 ($N_2SA$: 42 m²/g) available from Cabot Japan K. K.

Silica: Ultrasil VN3 ($N_2SA$: 175 m²/g) available from Evonik Degussa

Silane coupling agent: Si69 (bis(3-triethoxysilylpropyl) tetrasulfide) available from Evonik Degussa Age resister: Nocrac 6C (N-phenyl-N'-(1, 3-dimethylbutyl)-p-phenylenediamine, 6PPD) available from Ouchi Shinko Chemical Industrial Co., Ltd.

Oil: Diana Process AH-24 available from Idemitsu Kosan Co., Ltd.

Wax: Ozoace 0355 available from Nippon Seiro Co., Ltd.

Zinc oxide: Zinc oxide #2 available from Mitsui Mining and Smelting Co., Ltd.

Stearic acid: Stearic acid beads "Tsubaki" available from NOF Corporation

Sulfur: Seimi Sulfur (oil content: 10%) available from Nippon Kanryu Industry Co., Ltd.

Vulcanization accelerator: NOCCELER DZ (N,N'-dicyclohexyl-2-benzothiazole sulfenamide) available from Ouchi Shinko Chemical Industrial Co., Ltd.

Examples 8-1 to 8-5, Comparative Examples 8-1 to 8-4

Unvulcanized rubber compositions and vulcanized rubber compositions were prepared as in Example 1-1, but using the formulations shown in Table 9.

Separately, each unvulcanized rubber composition was formed into the shape of a tread and assembled with other tire components on a tire building machine to build an unvulcanized tire, which was then vulcanized to prepare a test tire (size: 195/65R15).

The unvulcanized rubber compositions, vulcanized rubber compositions, and test tires thus prepared were evaluated on the following items. Table 9 shows the results.

(Viscoelasticity Test)

A viscoelasticity test was performed as in Example 1-1, except that specimens were cut out of the tread of the test tire, and the index (elastic modulus index) was calculated using the following equation.

(Elastic modulus $a$ index)=($E^*a$ of each formulation)/($E^*a$ of Comparative Example 8-1)×100

(Elastic modulus $b$ index)=($E^*b$ of each formulation)/($E^*b$ of Comparative Example 8-1)×100

(Tensile Test)

A tensile test was performed as in Example 1-1, except that the index (tensile strength index) was calculated using the following equation.

(Tensile strength index)=($EB \times TB$ of each formulation)/($EB \times TB$ of Comparative Example 8-1)×100

(Fuel Economy)

Fuel economy was evaluated as in Example 1-1, except that the index (fuel economy index) was calculated using the following equation.

(Fuel economy index)=(tan δ of Comparative Example 8-1)/(tan δ of each formulation)×100

(Processability: Measurement of Mooney Viscosity)

Processability was evaluated as in Example 1-1, except that the index (Mooney viscosity index) was calculated using the following equation.

(Mooney viscosity index)=($ML_{1+4}$ of Comparative Example 8-1)/($ML_{1+4}$ of each formulation)×100

(Wet-Grip Performance)

The test tires of each formulation were mounted on all the wheels of a vehicle (front-engine, front-wheel-drive car of 2,000 cc displacement made in Japan), and the braking distance from an initial speed of 100 km/h on a wet asphalt road was determined. The result was expressed as an index. A higher index value indicates better wet-skid resistance (wet-grip performance). The index was determined using the following equation.

(Wet-skid resistance index)=(Braking distance of Comparative Example 8-1)/(Braking distance of each formulation)×100

(Tire Performance Balance Index)

A balance index was calculated from the above indexes according to the equation below. A higher index indicates a better balance of handling stability, fuel economy, durability, processability, and wet-grip performance.

(Balance index)=(Elastic modulus $a$ index)×(Tensile strength index)×(Fuel economy index)×(Mooney viscosity index)×(Wet-skid resistance index)/100,000,000

TABLE 9

|  |  | Comparative Example 8-1 | Example 8-1 | Example 8-2 | Example 8-3 | Example 8-4 | Example 8-5 | Comparative Example 8-2 | Comparative Example 8-3 | Comparative Example 8-4 |
|---|---|---|---|---|---|---|---|---|---|---|
| Formulation (parts by mass) | X-1 | — | 10.75 | — | — | — | — | — | — | — |
|  | X-2 | — | — | 10.75 | — | — | — | — | — | — |
|  | X-3 | — | — | — | 12.25 | 24.5 | — | — | — | — |
|  | X-4 | — | — | — | — | — | 5.38 | 5.38 | — | — |
|  | X-5 | — | — | — | — | — | — | — | 5 | — |
|  | X-6 | — | — | — | — | — | 5 | — | — | 5 |
|  | Natural rubber | 30 | 30 | 30 | 30 | 30 | 30 | 30 | 30 | 30 |
|  | Styrene-butadiene rubber | 70 | 70 | 70 | 70 | 70 | 70 | 70 | 70 | 70 |
|  | Carbon black | 10 | 10 | 10 | 10 | 10 | 10 | 10 | 10 | 10 |
|  | Silica | 80 | 80 | 80 | 80 | 80 | 80 | 80 | 80 | 80 |
|  | Silane coupling agent | 4 | 4 | 4 | 4 | 4 | 4 | 4 | 4 | 4 |
|  | Age resister | 1.5 | 1.5 | 1.5 | 1.5 | 1.5 | 1.5 | 1.5 | 1.5 | 1.5 |
|  | Oil | 15 | 15 | 15 | 15 | 15 | 15 | 15 | 15 | 15 |
|  | Wax | 1.5 | 1.5 | 1.5 | 1.5 | 1.5 | 1.5 | 1.5 | 1.5 | 1.5 |
|  | Zinc oxide | 2 | 2 | 2 | 2 | 2 | 2 | 2 | 2 | 2 |
|  | Stearic acid | 2 | 2 | 2 | 2 | 2 | 2 | 2 | 2 | 2 |
|  | Sulfur | 2 | 2 | 2 | 2 | 2 | 2 | 2 | 2 | 2 |
|  | Vulcanization accelerator | 1 | 1 | 1 | 1 | 1 | 1 | 1 | 1 | 1 |
| Amount of modified cellulose fiber (parts by mass) |  | — | 5 | 5 | 5 | 10 | 5 | 5 | — | — |
| Evaluation | Elastic modulus a in circumferential direction | 100 | 167 | 170 | 180 | 268 | 168 | 165 | 92 | 93 |
|  | Elastic modulus b in radial direction | 100 | 120 | 123 | 130 | 167 | 115 | 102 | 90 | 94 |
|  | Tensile strength | 100 | 79 | 80 | 90 | 82 | 78 | 68 | 89 | 90 |
|  | Fuel economy | 100 | 85 | 85 | 95 | 86 | 79 | 73 | 65 | 68 |
|  | Processability | 100 | 100 | 101 | 102 | 101 | 100 | 98 | 99 | 97 |
|  | Wet-grip performance | 100 | 110 | 112 | 115 | 121 | 109 | 103 | 100 | 105 |
|  | Balance index | 100 | 123 | 131 | 181 | 231 | 113 | 83 | 53 | 58 |

In Table 9, the "Amount of modified cellulose fiber (parts by mass)" means the amount (parts by mass) of the modified cellulose fiber relative to 100 parts by mass of the rubber component in the rubber composition.

Table 9 shows that, in Examples 8-1 to 8-5 using modified cellulose fiber-containing rubber compositions each of which contained a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C), the dispersibility of the cellulose fiber in rubber was improved so that elastic modulus and wet-grip performance were improved. The tensile strength, fuel economy, and processability in the examples were better than or equivalent to those in Comparative Example 8-2 in which a modified cellulose fiber (A) was contained but no dispersing polymer (B) was contained. In particular, the balance of elastic modulus, tensile strength, fuel economy, processability, and wet-grip performance was improved in the examples. Thus, it was demonstrated that excellent rigidity, excellent tensile properties, excellent processability, excellent wet-grip performance, and low energy loss (rolling resistance) were simultaneously achieved. This proves that a pneumatic tire including a tread formed from such a modified cellulose fiber-containing rubber composition has a good balance of excellent handling stability, rolling resistance, durability, and wet-grip performance and can be produced with high productivity. It was further demonstrated that in such a rubber composition, the dispersibility of the cellulose fiber in rubber was improved so that excellent rigidity was achieved not only in the tire circumferential direction but also in the tire radial direction in the tread, which proves that the resulting pneumatic tire has very excellent handling stability.

As shown from the foregoing results, modified cellulose fiber-containing rubber compositions each of which contains a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C), allowed the dispersibility of the cellulose fiber in rubber to be improved, and simultaneously achieved excellent rigidity, excellent tensile properties, and low energy loss, and therefore pneumatic tires including at least one selected from the group consisting of a bead apex, a clinch apex, a ply topping, and a tread formed from such modified cellulose fiber-containing rubber compositions had a good balance of excellent handling stability, rolling resistance, and durability. It was further demonstrated that in such rubber compositions, the dispersibility of the cellulose fiber in rubber was improved so that excellent rigidity was achieved not only in the tire circumferential direction but also in the tire radial direction, and the resulting pneumatic tires had very excellent handling stability.

<Lining Strip Layer of Run-Flat Tire>

Various chemicals used in examples and comparative examples are listed below.

X-1 to X-6: Resin compositions X-1 to X-6 prepared in Preparation Examples 1 to 6

Natural rubber: TSR20

Polybutadiene rubber BR150B: BR150B (cis content: 97% by mass, $ML_{1+4}$ (100° C.): 40, viscosity of 5% toluene solution (25° C.) 48 cps, Mw/Mn: 3.3) available from Ube Industries, Ltd.

Polybutadiene rubber VCR412: VCR412 (SPB-containing BR, cis content: 98% by mass, SPB content: 12% by mass, primary particle size of SPB: 250 nm, vinyl content: 1% by mass) available from Ube Industries, Ltd.

Carbon black: Shoblack N550 ($N_2SA$: 42 $m^2/g$) available from Cabot Japan K. K.

Oil: Diana Process AH-24 available from Idemitsu Kosan Co., Ltd.

Age resister: Nocrac 6C (N-phenyl-N'-(1,3-dimethylbutyl)-p-phenylenediamine, 6PPD) available from Ouchi Shinko Chemical Industrial Co., Ltd.

Zinc oxide: Zinc oxide #2 available from Mitsui Mining and Smelting Co., Ltd.

Stearic acid: Stearic acid beads "Tsubaki" available from NOF Corporation

Sulfur: Seimi Sulfur (oil content: 10%) available from Nippon Kanryu Industry Co., Ltd.

Vulcanization accelerator: NOCCELER CZ (N-cyclohexyl-2-benzothiazole sulfenamide) available from Ouchi Shinko Chemical Industrial Co., Ltd.

Examples 9-1 to 9-5, Comparative Examples 9-1 to 9-5

Unvulcanized rubber compositions and vulcanized rubber compositions were prepared as in Example 1-1, but using the formulations shown in Table 10.

Separately, each unvulcanized rubber composition was formed into the shape of a lining strip layer and assembled with other tire components on a tire building machine to build an unvulcanized tire, which was then vulcanized to prepare a test tire (size: 215/45R17; run-flat tire for passenger vehicles).

The unvulcanized rubber compositions, vulcanized rubber compositions, and test tires thus prepared were evaluated on the following items. Table 10 shows the results.

(Viscoelasticity Test)

A viscoelasticity test was performed as in Example 1-1, except that specimens were cut out of the lining strip layer of the test tire, and the index (elastic modulus index) was calculated using the following equation.

(Elastic modulus $a$ index)=($E^*a$ of each formulation)/($E^*a$ of Comparative Example 9-1)×100

(Elastic modulus $b$ index)=($E^*b$ of each formulation)/($E^*b$ of Comparative Example 9-1)×100

(Tensile Test)

A tensile test was performed as in Example 1-1, except that the index (tensile strength index) was calculated using the following equation.

(Tensile strength index)=($EB \times TB$ of each formulation)/($EB \times TB$ of Comparative Example 9-1)×100

(Fuel Economy)

Fuel economy was evaluated as in Example 1-1, except that the index (fuel economy index) was calculated using the following equation.

(Fuel economy index)=(tan δ of Comparative Example 9-1)/(tan δ of each formulation)×100

(Tire Performance Balance Index)

The balance index was determined as in Example 1-1.

(Processability: Measurement of Mooney Viscosity)

Processability was evaluated as in Example 1-1, except that the index (Mooney viscosity index) was calculated using the following equation.

(Mooney viscosity index)=($ML_{1+4}$ of Comparative Example 9-1)/($ML_{1+4}$ of each formulation)×100

(Run-Flat Durability)

The test tire with an internal air pressure of 0 kPa was run on a drum at 80 km/h. The running distance until the test tire broke down was measured and expressed as an index (run-flat durability index), with the running distance of Comparative Example 9-1 set equal to 100. A higher index indicates better run-flat durability.

composition, the dispersibility of the cellulose fiber in rubber was improved so that excellent rigidity was achieved not only in the tire circumferential direction but also in the

TABLE 10

| | | Comparative Example 9-1 | Example 9-1 | Example 9-2 | Example 9-3 | Example 9-4 | Example 9-5 | Comparative Example 9-2 | Comparative Example 9-3 | Comparative Example 9-4 | Comparative Example 9-5 |
|---|---|---|---|---|---|---|---|---|---|---|---|
| Formulation (parts by mass) | X-1 | — | 10.75 | — | — | — | — | — | — | — | — |
| | X-2 | — | — | 10.75 | — | — | — | — | — | — | — |
| | X-3 | — | — | — | 12.25 | 24.5 | — | — | — | — | — |
| | X-4 | — | — | — | — | — | 5.38 | 5.38 | — | — | — |
| | X-5 | — | — | — | — | — | — | — | 5 | — | — |
| | X-6 | — | — | — | — | — | 5 | — | — | 5 | — |
| | Natural rubber | 25 | 25 | 25 | 25 | 25 | 25 | 25 | 25 | 25 | 25 |
| | Polybutadiene rubber BR150B | 65 | 75 | 75 | 75 | 75 | 75 | 75 | 75 | 75 | 65 |
| | Polybutadiene rubber VCR412 | 10 | — | — | — | — | — | — | — | — | 10 |
| | Carbon black | 40 | 40 | 40 | 40 | 40 | 40 | 40 | 40 | 40 | 70 |
| | Oil | 2 | 2 | 2 | 2 | 2 | 2 | 2 | 2 | 2 | 2 |
| | Age resister | 2 | 2 | 2 | 2 | 2 | 2 | 2 | 2 | 2 | 2 |
| | Zinc oxide | 6 | 6 | 6 | 6 | 6 | 6 | 6 | 6 | 6 | 6 |
| | Stearic acid | 3 | 3 | 3 | 3 | 3 | 3 | 3 | 3 | 3 | 3 |
| | Sulfur | 7 | 7 | 7 | 7 | 7 | 7 | 7 | 7 | 7 | 7 |
| | Vulcanization accelerator | 2 | 2 | 2 | 2 | 2 | 2 | 2 | 2 | 2 | 2 |
| Amount of modified cellulose fiber (parts by mass) | | — | 5 | 5 | 5 | 10 | 5 | 5 | — | — | — |
| Evaluation | Elastic modulus a in circumferential direction | 100 | 151 | 150 | 158 | 193 | 149 | 140 | 91 | 92 | 155 |
| | Elastic modulus b in radial direction | 100 | 123 | 124 | 130 | 168 | 108 | 101 | 91 | 91 | 156 |
| | Tensile strength | 100 | 88 | 87 | 89 | 85 | 85 | 75 | 89 | 93 | 75 |
| | Fuel economy | 100 | 87 | 88 | 92 | 85 | 79 | 69 | 83 | 85 | 60 |
| | Balance index | 100 | 116 | 115 | 129 | 139 | 100 | 72 | 67 | 73 | 70 |
| | Processability | 100 | 100 | 101 | 102 | 101 | 100 | 95 | 100 | 99 | 80 |
| | Run-flat durability | 100 | 108 | 108 | 112 | 115 | 102 | 100 | 97 | 98 | 92 |

In Table 10, the "Amount of modified cellulose fiber (parts by mass)" means the amount (parts by mass) of the modified cellulose fiber relative to 100 parts by mass of the rubber component in the rubber composition.

Table 10 shows that, in Examples 9-1 to 9-5 using modified cellulose fiber-containing rubber compositions each of which contained a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and a rubber component (C), the dispersibility of the cellulose fiber in rubber was improved so that elastic modulus was improved. The tensile strength, fuel economy, processability, and run-flat durability in the examples were better than or equivalent to those in Comparative Example 9-2 in which a modified cellulose fiber (A) was contained but no dispersing polymer (B) was contained. In particular, the balance of elastic modulus, tensile strength, and fuel economy was improved in the examples. Thus, it was demonstrated that excellent rigidity, excellent tensile properties, and low energy loss (rolling resistance) were simultaneously achieved and sufficient run-flat durability was also ensured. This proves that a run-flat tire including a lining strip layer formed from such a modified cellulose fiber-containing rubber composition has a good balance of excellent handling stability, rolling resistance, and durability and further has excellent run-flat durability. It was further demonstrated that in such a rubber tire radial direction, which proves that the resulting run-flat tire including a lining strip layer has very excellent handling stability.

It can be considered that reinforcing properties can be enhanced by using a large amount of carbon black, instead of using the cellulose fiber. However, as shown from the results of Comparative Example 9-5, the use of a large amount of carbon black can improve rigidity but fails to achieve a balanced improvement of rigidity, tensile properties, and rolling resistance and also shows poor processability.

The invention claimed is:

1. A pneumatic tire, comprising a sidewall formed from a modified cellulose fiber-containing rubber composition,
    the modified cellulose fiber-containing rubber composition comprising
    a modified cellulose fiber (A) obtained by adding a C15 or higher cyclic polybasic acid anhydride (a) containing a hydrophobic group to a cellulose fiber through esterification,
    a dispersing polymer (B) having a softening point of 135° C. or lower, and
    a rubber component (C).

2. A pneumatic tire, comprising a base tread formed from a modified cellulose fiber-containing rubber composition,
    the modified cellulose fiber-containing rubber composition comprising
    a modified cellulose fiber (A) obtained by adding a C15 or higher cyclic polybasic acid anhydride (a) containing a hydrophobic group to a cellulose fiber through esterification, a dispersing polymer (B) having a softening point of 135° C. or lower, and
a rubber component (C).

3. A pneumatic tire, comprising a breaker topping formed from a modified cellulose fiber-containing rubber composition,
the modified cellulose fiber-containing rubber composition comprising
a modified cellulose fiber (A) obtained by adding a C15 or higher cyclic polybasic acid anhydride (a) containing a hydrophobic group to a cellulose fiber through esterification,
a dispersing polymer (B) having a softening point of 135° C. or lower, and
a rubber component (C).

4. A pneumatic tire, comprising an innerliner formed from a modified cellulose fiber-containing rubber composition,
the modified cellulose fiber-containing rubber composition comprising
a modified cellulose fiber (A) obtained by adding a C15 or higher cyclic polybasic acid anhydride (a) containing a hydrophobic group to a cellulose fiber through esterification,
a dispersing polymer (B) having a softening point of 135° C. or lower, and
a rubber component (C).

5. A pneumatic tire, comprising at least one selected from the group consisting of a bead apex, a clinch apex, a ply topping, and a tread each formed from a modified cellulose fiber-containing rubber composition,
the modified cellulose fiber-containing rubber composition comprising
a modified cellulose fiber (A) obtained by adding a C15 or higher cyclic polybasic acid anhydride (a) containing a hydrophobic group to a cellulose fiber through esterification,
a dispersing polymer (B) having a softening point of 135° C. or lower, and
a rubber component (C).

6. The pneumatic tire according to claim 1, wherein the cyclic polybasic acid anhydride (a) is at least one selected from the group consisting of acid anhydride group-containing petroleum resins and acid anhydride group-containing coal resins.

7. The pneumatic tire according to claim 1, wherein the dispersing polymer (B) is at least one selected from the group consisting of petroleum resins and coal resins.

8. The pneumatic tire according to claim 1, wherein the rubber component (C) is at least one selected from the group consisting of natural rubber, modified natural rubbers, synthetic rubbers, and modified synthetic rubbers.

9. The pneumatic tire according to claim 1, wherein the modified cellulose fiber-containing rubber composition comprises the modified cellulose fiber (A) in an amount of 0.01 to 30 parts by mass relative to 100 parts by mass of the rubber component (C).

10. The pneumatic tire according to claim 1,
wherein the modified cellulose fiber-containing rubber composition is obtained by the steps of:
kneading the modified cellulose fiber (A) with the dispersing polymer (B) to give a kneaded mixture, and
kneading the kneaded mixture with the rubber component (C).

11. A run-flat tire, comprising a lining strip layer formed from a modified cellulose fiber-containing rubber composition,
the modified cellulose fiber-containing rubber composition comprising
a modified cellulose fiber (A) obtained by adding a C15 or higher cyclic polybasic acid anhydride (a) containing a hydrophobic group to a cellulose fiber through esterification,
a dispersing polymer (B) having a softening point of 135° C. or lower, and
a rubber component (C).

12. The run-flat tire according to claim 11, wherein the cyclic polybasic acid anhydride (a) is at least one selected from the group consisting of acid anhydride group-containing petroleum resins and acid anhydride group-containing coal resins.

13. The run-flat tire according to claim 11, wherein the dispersing polymer (B) is at least one selected from the group consisting of petroleum resins and coal resins.

14. The run-flat tire according to claim 11,
wherein the rubber component (C) is at least one selected from the group consisting of natural rubber, modified natural rubbers, synthetic rubbers, and modified synthetic rubbers.

15. The run-flat tire according to claim 11, wherein the modified cellulose fiber-containing rubber composition comprises the modified cellulose fiber (A) in an amount of 0.01 to 30 parts by mass relative to 100 parts by mass of the rubber component (C).

16. The run-flat tire according to claim 11, wherein the modified cellulose fiber-containing rubber composition is obtained by the steps of:
kneading the modified cellulose fiber (A) with the dispersing polymer (B) to give a kneaded mixture, and
kneading the kneaded mixture with the rubber component (C).

17. The pneumatic tire according to claim 2, wherein the cyclic polybasic acid anhydride (a) is at least one selected from the group consisting of acid anhydride group-containing petroleum resins and acid anhydride group-containing coal resins.

18. The pneumatic tire according to claim 2, wherein the dispersing polymer (B) is at least one selected from the group consisting of petroleum resins and coal resins.

19. The pneumatic tire according to claim 2, wherein the rubber component (C) is at least one selected from the group consisting of natural rubber, modified natural rubbers, synthetic rubbers, and modified synthetic rubbers.

20. The pneumatic tire according to claim 2, wherein the modified cellulose fiber-containing rubber composition comprises the modified cellulose fiber (A) in an amount of 0.01 to 30 parts by mass relative to 100 parts by mass of the rubber component (C).

21. The pneumatic tire according to claim 2,
wherein the modified cellulose fiber-containing rubber composition is obtained by the steps of:
kneading the modified cellulose fiber (A) with the dispersing polymer (B) to give a kneaded mixture, and
kneading the kneaded mixture with the rubber component (C).

22. The pneumatic tire according to claim 3, wherein the cyclic polybasic acid anhydride (a) is at least one selected from the group consisting of acid anhydride group-containing petroleum resins and acid anhydride group-containing coal resins.

23. The pneumatic tire according to claim 3, wherein the dispersing polymer (B) is at least one selected from the group consisting of petroleum resins and coal resins.

24. The pneumatic tire according to claim 3, wherein the rubber component (C) is at least one selected from the group consisting of natural rubber, modified natural rubbers, synthetic rubbers, and modified synthetic rubbers.

25. The pneumatic tire according to claim 3, wherein the modified cellulose fiber-containing rubber composition comprises the modified cellulose fiber (A) in an amount of 0.01 to 30 parts by mass relative to 100 parts by mass of the rubber component (C).

26. The pneumatic tire according to claim 3,
wherein the modified cellulose fiber-containing rubber composition is obtained by the steps of:
kneading the modified cellulose fiber (A) with the dispersing polymer (B) to give a kneaded mixture, and
kneading the kneaded mixture with the rubber component (C).

27. The pneumatic tire according to claim 4, wherein the cyclic polybasic acid anhydride (a) is at least one selected from the group consisting of acid anhydride group-containing petroleum resins and acid anhydride group-containing coal resins.

28. The pneumatic tire according to claim 4, wherein the dispersing polymer (B) is at least one selected from the group consisting of petroleum resins and coal resins.

29. The pneumatic tire according to claim 4, wherein the rubber component (C) is at least one selected from the group consisting of natural rubber, modified natural rubbers, synthetic rubbers, and modified synthetic rubbers.

30. The pneumatic tire according to claim 4, wherein the modified cellulose fiber-containing rubber composition comprises the modified cellulose fiber (A) in an amount of 0.01 to 30 parts by mass relative to 100 parts by mass of the rubber component (C).

31. The pneumatic tire according to claim 4,
wherein the modified cellulose fiber-containing rubber composition is obtained by the steps of:
kneading the modified cellulose fiber (A) with the dispersing polymer (B) to give a kneaded mixture, and
kneading the kneaded mixture with the rubber component (C).

32. The pneumatic tire according to claim 5, wherein the cyclic polybasic acid anhydride (a) is at least one selected from the group consisting of acid anhydride group-containing petroleum resins and acid anhydride group-containing coal resins.

33. The pneumatic tire according to claim 5, wherein the dispersing polymer (B) is at least one selected from the group consisting of petroleum resins and coal resins.

34. The pneumatic tire according to claim 5, wherein the rubber component (C) is at least one selected from the group consisting of natural rubber, modified natural rubbers, synthetic rubbers, and modified synthetic rubbers.

35. The pneumatic tire according to claim 5, wherein the modified cellulose fiber-containing rubber composition comprises the modified cellulose fiber (A) in an amount of 0.01 to 30 parts by mass relative to 100 parts by mass of the rubber component (C).

36. The pneumatic tire according to claim 5,
wherein the modified cellulose fiber-containing rubber composition is obtained by the steps of:
kneading the modified cellulose fiber (A) with the dispersing polymer (B) to give a kneaded mixture, and
kneading the kneaded mixture with the rubber component (C).

* * * * *